United States Patent
Yu et al.

(10) Patent No.: US 7,532,284 B2
(45) Date of Patent: May 12, 2009

(54) OPTICAL DEVICE AND METHOD FOR MAKING THE SAME

(75) Inventors: Tsai-An Yu, Hsin Chu Hsien (TW); Pi-Sung Lin, Taipei Hsien (TW); Chih-Jen Chen, Taipei Hsien (TW); Chiu-Fang Huang, Taipei Hsien (TW); Wen-Yi Lin, Tao Yuan Hsien (TW)

(73) Assignee: Far Eastern Textile Ltd., Taipei (TW)

( * ) Notice: Subject to any disclaimer, the term of this patent is extended or adjusted under 35 U.S.C. 154(b) by 854 days.

(21) Appl. No.: 11/075,499

(22) Filed: Mar. 9, 2005

(65) Prior Publication Data
US 2006/0068517 A1    Mar. 30, 2006

(30) Foreign Application Priority Data
Sep. 27, 2004  (TW) .............................. 93129218 A
Dec. 1, 2004   (TW) .............................. 93137027 A

(51) Int. Cl.
*G02F 1/1335* (2006.01)

(52) U.S. Cl. ...................................................... 349/117

(58) Field of Classification Search ................... 349/117
See application file for complete search history.

(56) References Cited

U.S. PATENT DOCUMENTS

| 5,583,679 A | 12/1996 | Ito et al. |
| 6,531,195 B2 | 3/2003 | Negoro et al. |

FOREIGN PATENT DOCUMENTS

JP        2000-085057        3/2000

*Primary Examiner*—David Nelms
*Assistant Examiner*—Phu Vu
(74) *Attorney, Agent, or Firm*—Whyte Hirschboeck Dudek SC

(57) ABSTRACT

A method for making an optical device includes the steps of: rubbing an orienting film so as to stretch the molecular structure thereof and so as to permit the molecular units of the molecular structure to be aligned along a first axis and to permit the orienting space between each adjacent pair of the molecular units of the molecular structure to be oriented in a direction parallel to a second axis; and forming an optical anisotropical layer on the orienting film by applying a liquid crystal film of rod-like molecules on the orienting film which orients the rod-like molecules by virtue of spatial effect of the molecular units and the orienting spaces.

12 Claims, 20 Drawing Sheets

OPTICAL DEVICE AND METHOD FOR MAKING THE SAME

CROSS-REFERENCE TO RELATED APPLICATION

This application claims priority of Taiwanese Patent Application No. 093129218, filed on September 27, and No. 093137027, filed on Dec. 1, 2004.

BACKGROUND OF THE INVENTION

1. Field of the Invention

This invention relates to an optical device and a method for making the same, more particularly to a method using an orienting material having molecules with a molecular structure that is stretchable and that has molecular units and orienting spaces which are capable of orienting rod-like liquid crystal molecules of a liquid crystal material.

2. Description of the Related Art

Conventional compensators, which serve as phase retarders for correcting retardation or phase difference in a liquid crystal cell of a liquid crystal display so as to improve the viewing angle, the contrast, and the grey scale of the liquid crystal display, are commonly made by a polycarbonate film, which is required to be stretched along a machine direction (MD) or film moving direction. As a consequence, the extraordinary axis of the thus formed compensators is parallel to the machine direction. As such, the compensators cannot be attached to a polarizer in a roll-to-roll manner when the extraordinary axis of the compensator is to be formed an angle with an absorbing axis of the polarizer.

Optical compensators made from anisotropical materials of liquid crystal molecules are also known in the art.

The compensators are made by aligning the liquid crystal molecules on a substrate using an orienting film which is rubbed along a direction parallel to the machine direction. As a consequence, the projection of the orientation of the liquid crystal molecules of the thus formed compensator on a plane defined by the substrate is parallel to the film moving direction or the machine direction. Note that the compensators are normally produced in the form of rolls. Since the projection of the orientation of the liquid crystal molecules of a compensatory roll is parallel to the machine direction, the compensatory roll cannot be directly attached to a polarizer roll in a roll-to-roll manner for preparing a polarization element having a function of a quarter wave plate, which can generate a phase difference of λ/4 at a wave length of 550 nm, or a function of a half wave plate, which can generate a phase difference of λ/2 at a wavelength of 550 nm.

FIG. 1 illustrates a polarization element that includes a polarizer piece 1 and a compensator piece 21 cut from a compensator roll for attaching to the polarizer piece 1. In order to serve as a quarter wave plate, the compensator piece 21 is required to be cut from the compensator roll in such a manner that the projection 211 of the orientation of the liquid crystal molecules of the compensator piece 21 forms an angle of 45 degrees with the lengthwise direction (L) of the compensator piece 21, which is parallel to the absorbing axis 11 of the polarizer piece 1.

FIG. 2 illustrates a polarization element that includes a polarizer piece 1 and first and second compensator pieces 21, 22 that are cut from a compensator roll for attaching to the polarizer piece 1. In order to serve as a quarter wave plate, the first compensator piece 21 is required to be cut from the compensator roll in such a manner that the projection 211 of the orientation of the liquid crystal molecules of the first compensator piece 21 forms an angle of 75 degrees with the lengthwise direction (L1) of the first compensator piece 21, and in order to serve as a half wave plate, the second compensator piece 22 is required to be cut from the compensator roll in such a manner that the projection 221 of the orientation of the liquid crystal molecules of the second compensator piece 22 forms an angle of 15 degrees with the length with direction (L2) of the second compensator piece 22. The lengthwise direction (L1) of the first compensator piece 21 and the lengthwise direction (L2) of the second compensator piece 22 are parallel to the absorbing direction of the polarizer piece 1.

As such, mass production using the aforesaid compensators is difficult to achieve, and a large manpower for assembling the compensator pieces and the polarizer pieces is required.

U.S. Pat. No. 6,262,788 discloses a process for preparing an optical retardation film. The process is capable of permitting mass production of the retardation film in a roll-to-roll manner. The process uses a roller set for conveying a compensator substrate. The compensator substrate is continuously rubbed upon moving in a moving direction for alignment of liquid crystal molecules of a liquid crystal film thereon.

Although, theoretically speaking, the aforesaid process is capable of producing the retardation film with the liquid crystal molecules aligned in a direction that forms an angle ranging from 0 degree to 90 degrees with the machine direction or the lengthwise direction of the substrate, the process is relatively complicated due to the use of the roller set in the manufacturing process, and the quality of the product is difficult to control. Moreover, when a rubbing angle is greater than 45 degrees or smaller than −45 degrees, rubbing parameters during rubbing of the compensatory substrate and tension of the compensatory substrate during conveying of the compensatory substrate are difficult to control.

U.S. Pat. No. 6,531,195 discloses an orienting layer of a copolymer for orienting liquid crystal molecules of an anisotropical layer thereon for preparing an optical compensatory sheet. The aforesaid orienting layer is disadvantageous in that the orientation of the liquid crystal molecules of the anisotropical layer can only be aligned by the orienting layer in a direction perpendicular to a rubbing direction or the machine direction.

Hence, there is a need to develop an orienting layer that is capable of orienting the liquid crystal molecules of an anisotropical layer of a compensator, which is in the form of a roll, such that the projection of the orientation of the liquid crystal molecules of the anisotropical layer forms an angle ranging from 0 degree to 90 degrees with the machine direction, thereby permitting assembly of the compensator and the polarizer in a roll-to-roll manner.

SUMMARY OF THE INVENTION

Therefore, the object of this invention is to provide a method for making an optical device that is capable of overcoming the aforesaid drawbacks of the prior art.

Another object of this invention is to provide an optical device that is capable of providing a wide-band compensating effect.

According to one aspect of the present invention, a method for making an optical device comprises the steps of: (a) providing an orienting film that is made from an orienting material having molecules, each of which has a molecular structure that is stretchable and that has a series of connected molecular units, each adjacent pair of the molecular units defining an orienting space therebetween; (b) rubbing the orienting film so as to stretch the molecular structure of each of the molecules of the orienting material and so as to permit the molecular units of the molecular structure to be aligned along a first axis and to permit the orienting space between each adjacent pair of the molecular units of the molecular structure to be oriented in a direction parallel to a second axis, the first and second axes forming a predetermined angle therebetween; and (c) forming an optical anisotropical layer on the orienting film by applying a liquid crystal film of rod-like molecules on the orienting film which orients the rod-like molecules by virtue of spatial effect of the molecular units and the orienting spaces among the molecular units of the molecular structure on the rod-like molecules.

According to another aspect of the present invention, an optical device comprises: a substrate defining a plane; an orienting film formed on the substrate and made from an orienting material having molecules, each of which has a molecular structure that is stretchable and that has a series of connected molecular units, each adjacent pair of the molecular units defining an orienting space therebetween, the molecular units of the molecular structure being aligned along a first axis, the orienting space between each adjacent pair of the molecular units of the molecular structure being oriented in a direction parallel to a second axis, the first and second axes forming a predetermined angle therebetween; and an optical anisotropical layer formed on the orienting film and made from a liquid crystal material of rod-like molecules that are spatially affected and oriented by the molecular units and the orienting spaces among the molecular units of the molecular structure in an orienting direction such that the projection of the orienting direction on the plane is parallel to the second axis.

According to yet another aspect of the present invention, an optical device comprises: a substrate defining a plane; an isotropic adhesive layer made from anisotropic material and formed on the substrate; and an optical anisotropical layer formed on the isotropic adhesive layer and made from a liquid crystal material of rod-like molecules that are oriented in a predetermined orienting direction.

BRIEF DESCRIPTION OF THE DRAWINGS

Other features and advantages of the present invention will become apparent in the following detailed description of the preferred embodiments of the invention, with reference to the accompanying drawings. In the drawings.

DETAILED DESCRIPTION OF THE PREFERRED EMBODIMENTS

Figure 6:
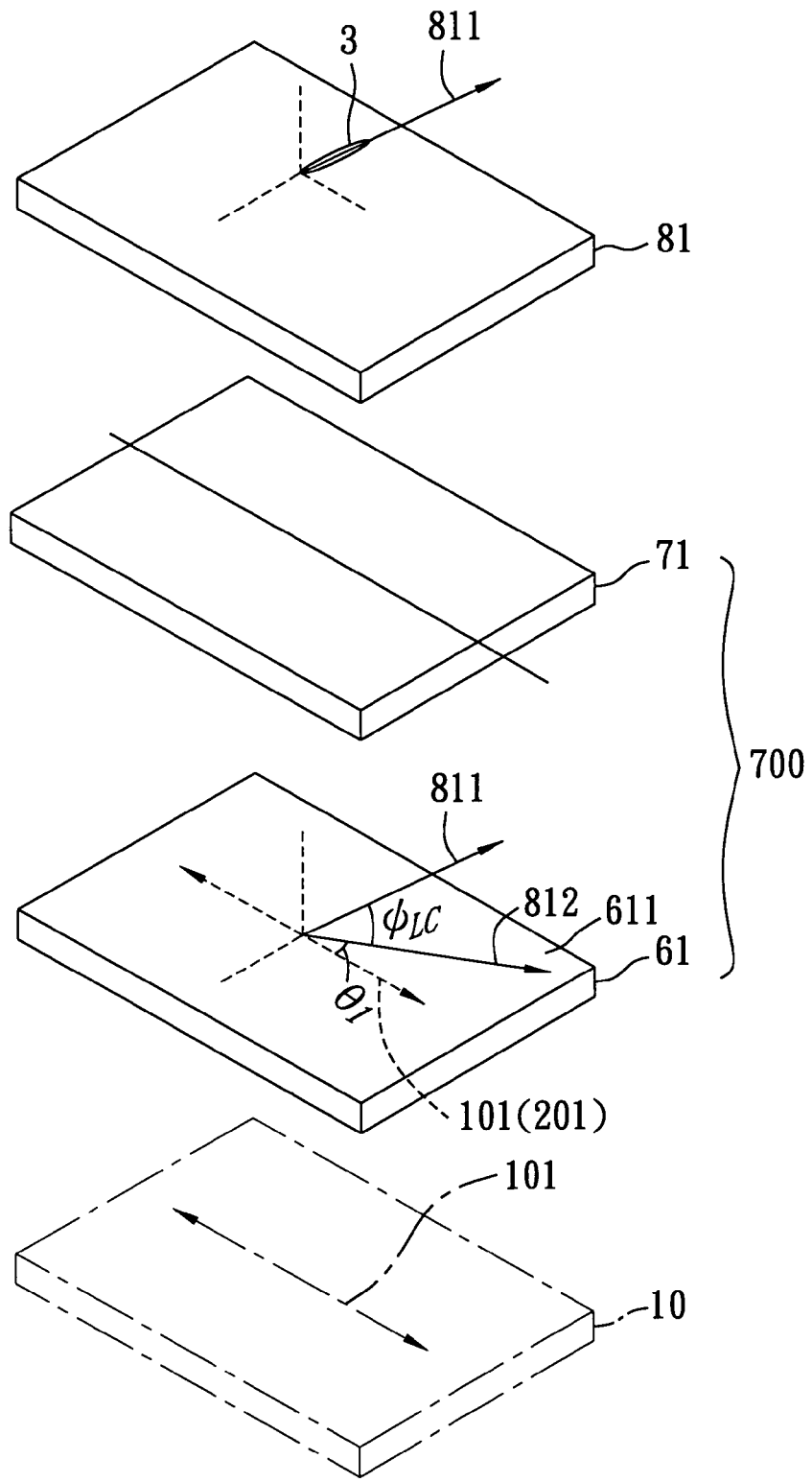
FIG. 6 is an exploded view of the first preferred embodiment of an optical device according to this invention.

FIG. 6 illustrates the first preferred embodiment of an optical device according to this invention for connecting to a polarizer 10 that has an absorbing axis 101. The optical device includes a first substrate 61, a first orienting film 71, and a first optical isotropic layer 81. The first orienting film 71 and the first substrate 61 cooperately define an orienting layer 700. The polarizer 10 is to be connected to the first substrate 61.

Figure 1:
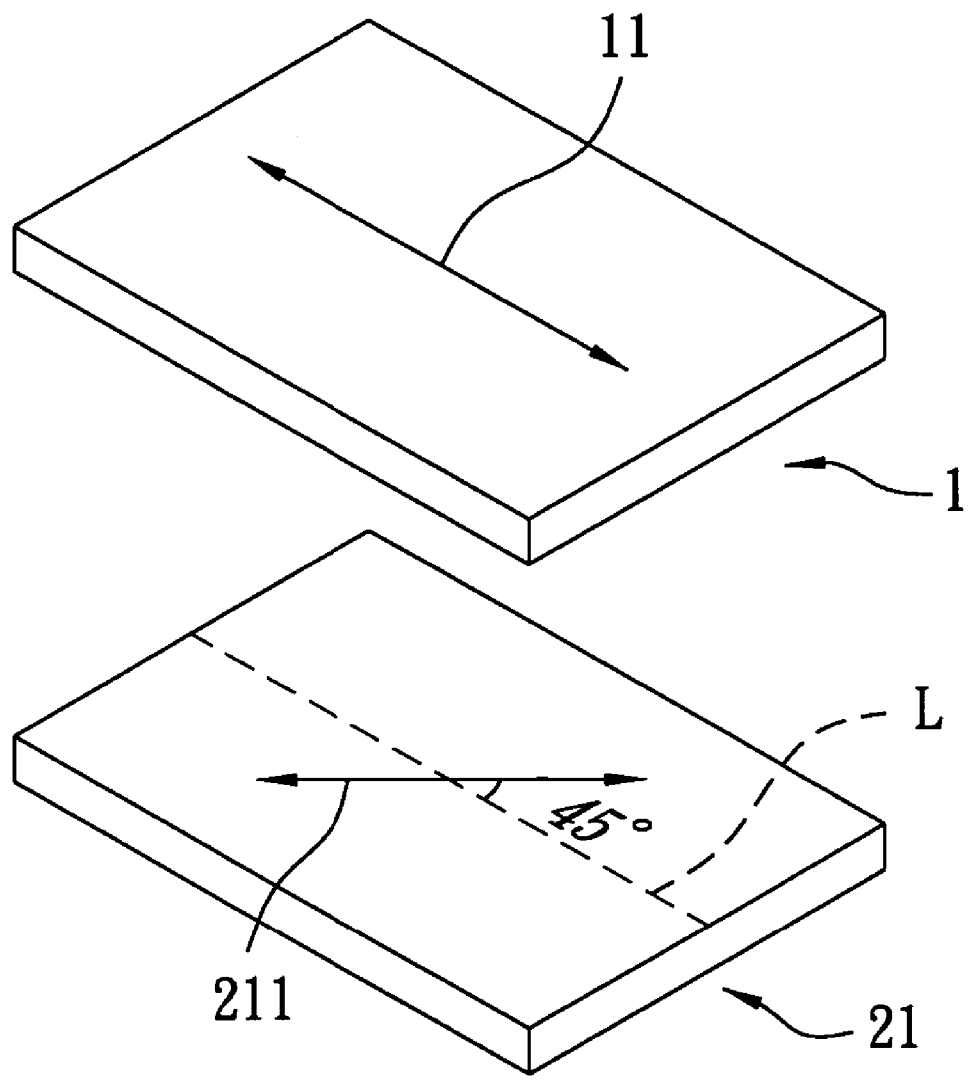
FIG. 1 is an exploded view of a conventional polarization element.
Figure 2:
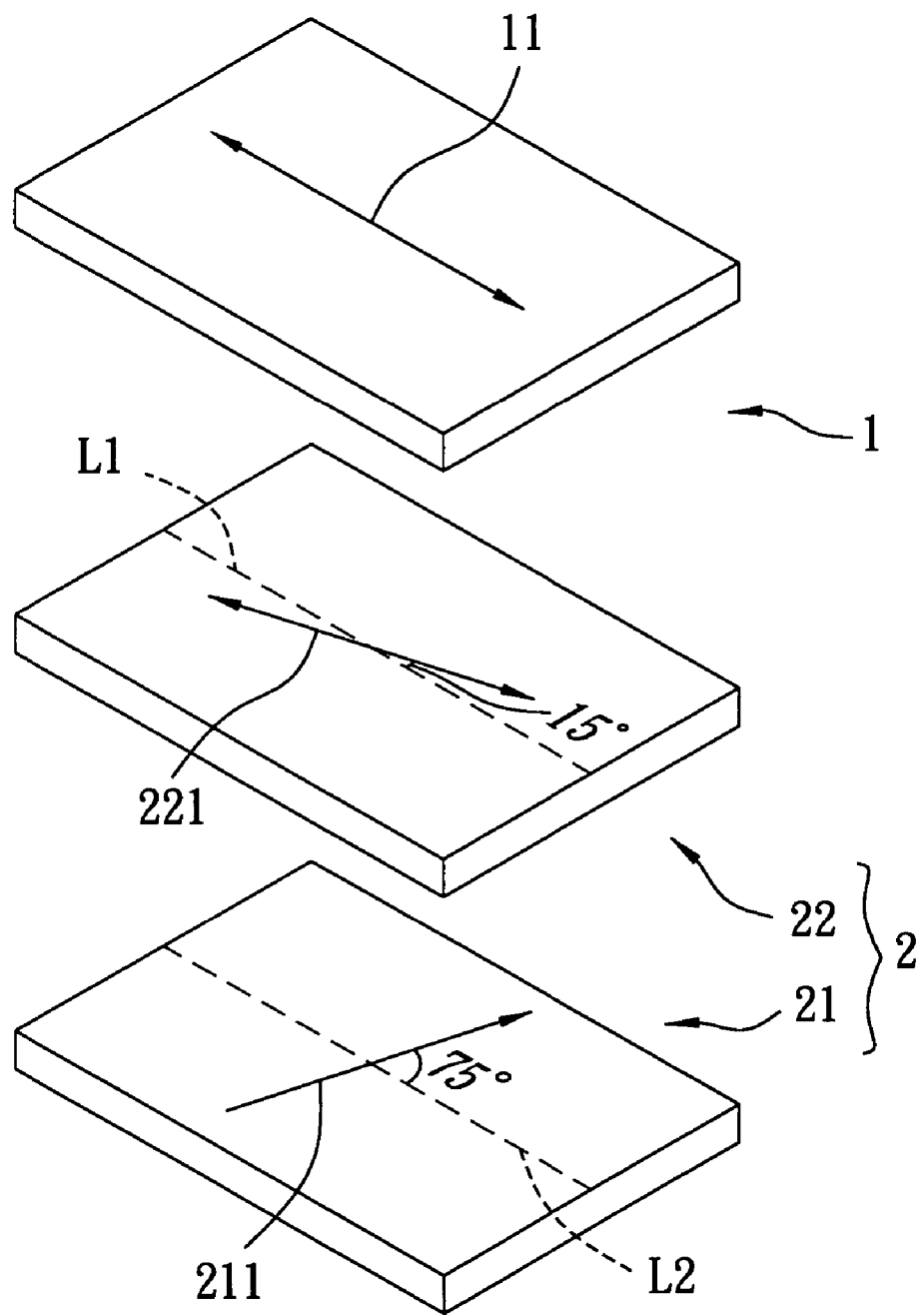
FIG. 2 is an exploded view of another conventional polarization element.
Figure 3:
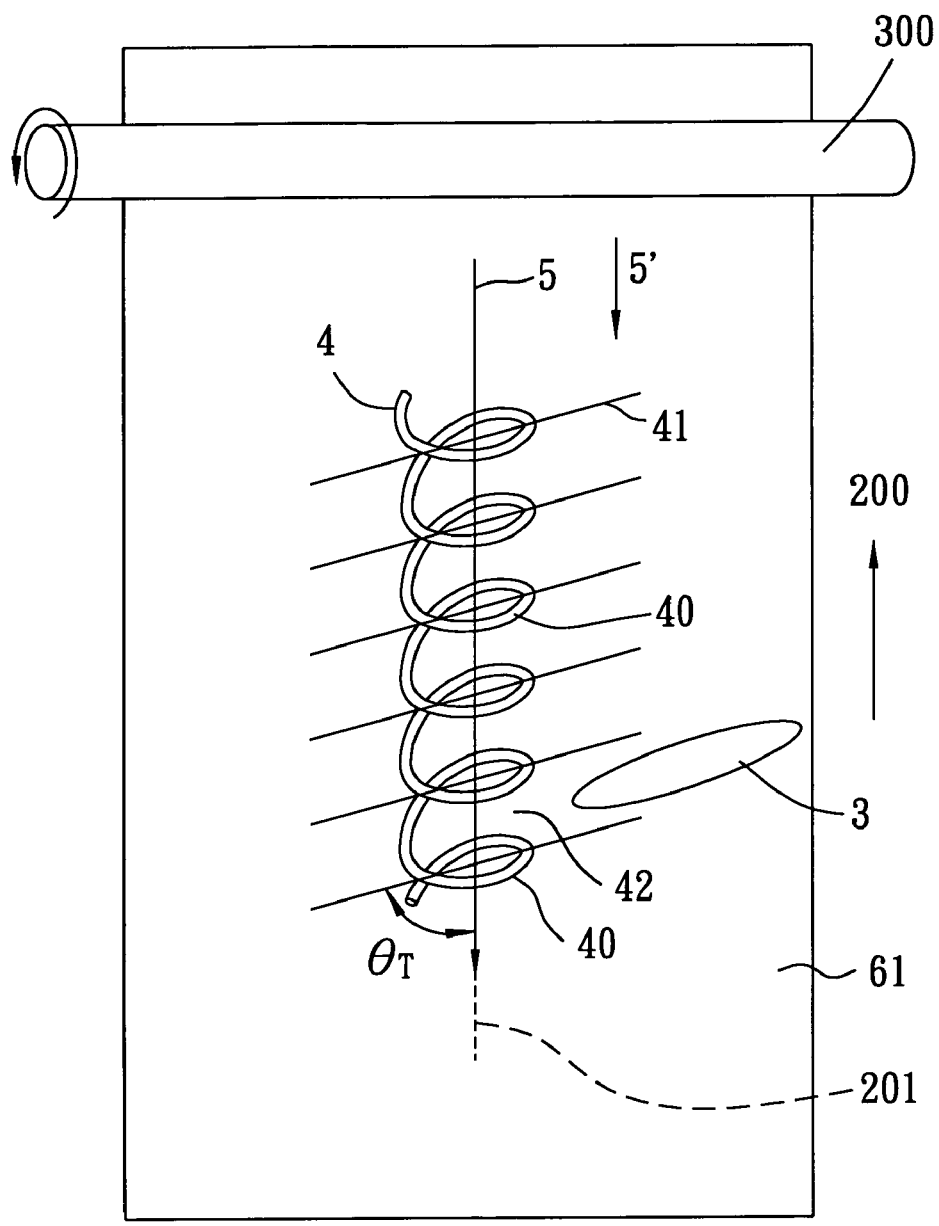
FIG. 3 is a schematic view of the preferred embodiment, illustrating how an orienting layer is rubbed using a roller having a rubbing direction parallel to a machine direction according to the method of this invention.

As illustrated in FIG. 3, the optical device is made by a method that comprises the steps of: (a) coating the first substrate 61, which defines a plane 611 and which is moved in a machine direction 200, with the first orienting film 71 (see FIG. 6) that is made from an orienting material having molecules, each of which has a molecular structure 4 (see FIG. 3) that is stretchable and that has a series of connected molecular units 40, each adjacent pair of the molecular units 40 defining an orienting space 42 therebetween; (b) rubbing the first orienting film 71 using a rubbing roller 300 so as to stretch the molecular structure 4 of each of the molecules of the orienting material and so as to permit the molecular units 40 of the molecular structure 4 to be aligned along a first axis 5, which is parallel to a rubbing direction 5' that is normal to the rubbing roller 300 in this embodiment, and to permit the orienting space 42 between each adjacent pair of the molecular units 40 of the molecular structure 4 to be oriented in a direction parallel to a second axis 41, the first and second axes 5, 41 forming a predetermined angle $\theta_T$ therebetween; and (c) forming the first optical anisotropical layer 81 (see FIG. 6) on the first orienting film 71 by applying a liquid crystal film of rod-like molecules 3 (see FIG. 3) on the first orienting film 71. The first orienting film 71 orients the rod-like molecules 3 of the liquid crystal film by virtue of spatial effect of the molecular units 40 and the orienting spaces 42 among the molecular units 40 of the molecular structure 4 on the rod-like molecules 3 such that the rod-like molecules 3 have an oriented angle $\theta_1$ (see FIG. 6) which is defined as an angle between the projection 812 of the orientation 811 of the rod-like molecules 3 on the plane 611 of the first substrate 61 and along direction 201 of the first substrate 61. The oriented angle $\theta_1$ will be hereinafter referred to the oriented angle $\theta_1$ of the first optical anisotropical layer 81. Note that the orientation 811 of the rod-like molecules 3 forms an inclined angle $\phi_{LC}$ with the plane 611 of the first substrate 61.

The long direction 201 of the first substrate 61 is parallel to the machine direction 200, and is set to be parallel to the absorbing axis 101 of the polarizer 10. The oriented angle $\theta_1$ of the rod-like molecules 3 is the summation of the angle $\theta_T$ and a rubbing angle $\theta_R$ (see FIGS. 4 and 5), where the rubbing angle $\theta_R$ is defined as the angle between the long direction 201 and the first axis 5 (note that the first axis 5 and the rubbing direction 5' are parallel to each other in the embodiments throughout this specification).

The oriented angle $\theta_1$ of the first optical anisotropical layer 81 can be altered within a range from 0 degree to 90 degrees by adjusting rubbing parameters, such as the rubbing direction 5'.

In FIG. 3, the rubbing roller 300 is parallel to a transverse direction relative to the long direction 201 of the first substrate 61 so that the first axis 5 is parallel to the long direction 201 of the first substrate 61, i.e., the rubbing angle $\theta_R$ is 0 degree. As such, the oriented angle $\theta_1$ of the first optical anisotropical layer 81 is equal to the angle $\theta_T$ between the first and second axes 5, 41.

Figure 4:
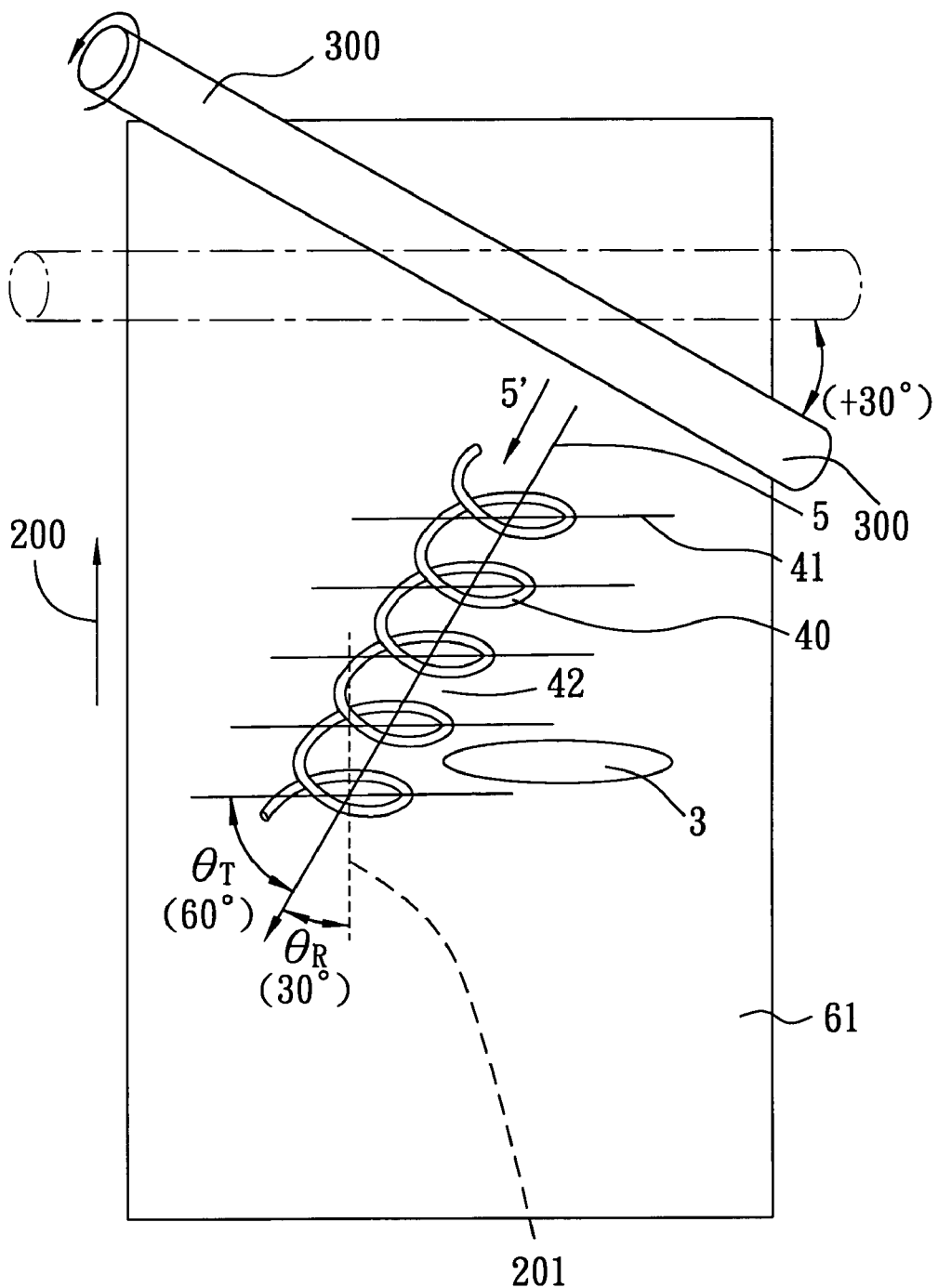
FIG. 4 is a schematic view of the preferred embodiment, illustrating how an orienting layer is rubbed using a roller having a rubbing direction forming an angle of 30 degrees with a machine direction according to the method of this invention.

In FIG. 4, the rubbing roller 300 forms a 30 degree angle with the transverse direction relative to the long direction 201 of the first substrate 61 so that the first axis 5 forms an angle of 30 degrees with the long direction 201 of the first substrate 61, i.e., the rubbing angle $\theta_R$ is 30 degrees. Moreover, the angle $\theta_T$ between the first and second axes 5, 41 is equal to 60 degrees. Hence, the oriented angle $\theta_1$ of the first optical anisotropical layer 81 is equal to 90 degrees.

Figure 5:
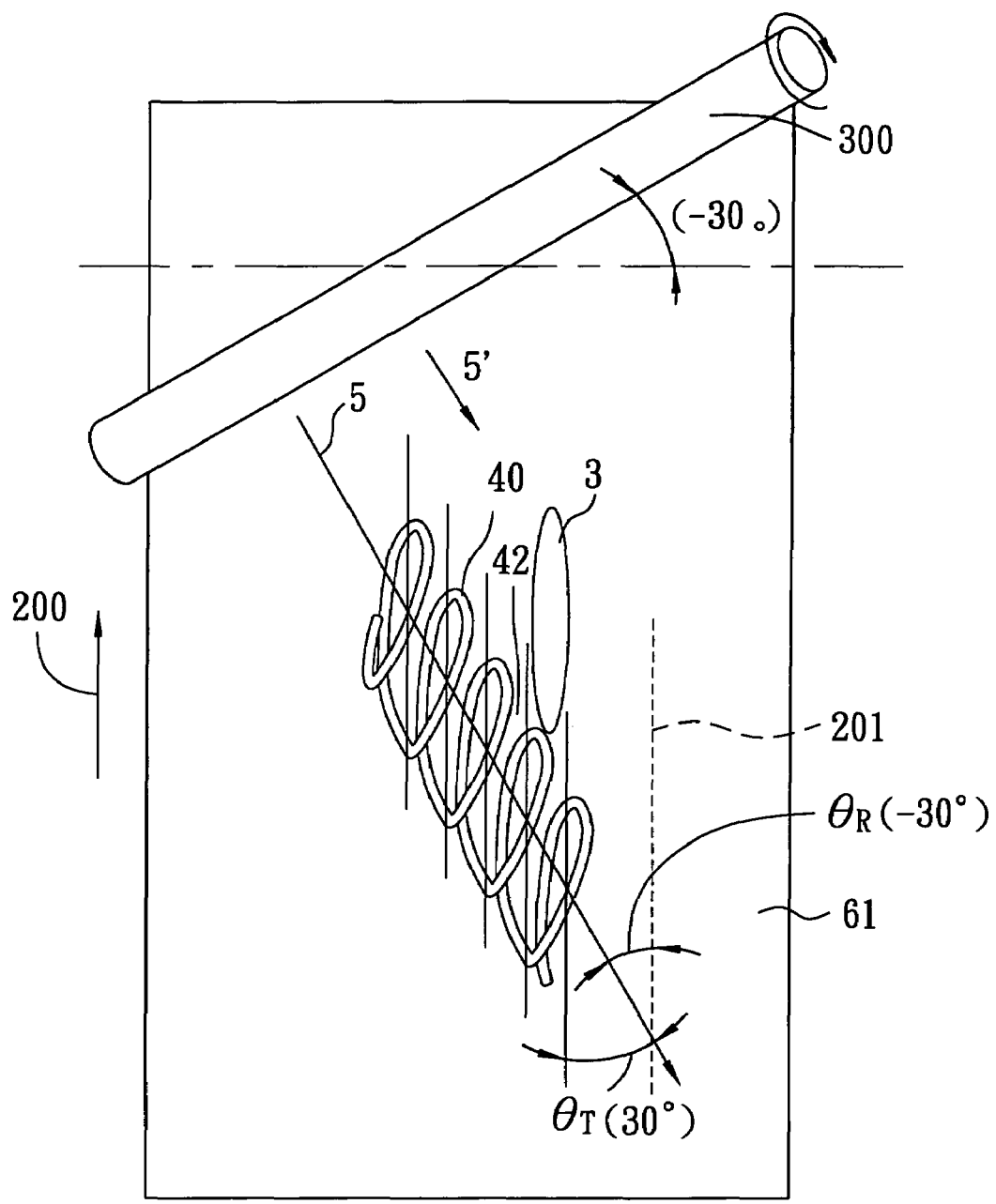
FIG. 5 is a schematic view of the preferred embodiment, illustrating how an orienting layer is rubbed using a roller having a rubbing direction forming an angle of −30 degrees with a machine direction according to the method of this invention.

In FIG. 5, the rubbing roller 300 forms a −30 degree angle with the transverse direction relative to the long direction 201 of the first substrate 61 so that the first axis 5 forms an angle of −30 degrees with the long direction 201 of the first substrate 61, i.e., the rubbing angle $\theta_R$ is −30 degrees. Moreover, the angle $\theta_T$ between the first and second axes 5, 41 is equal to 30 degrees. Hence, the oriented angle $\theta_1$ of the first optical anisotropical layer 81 is equal to 0 degree.

The angle $\theta_T$ between the first and second axes 5, 41 can be varied by adding a suitable amount of polyvinyl alcohol in the orienting material.

For the purpose of lowering manufacturing costs, the first substrate 61 is made from an inexpensive non-isotropic material. After successful formation of the first optical anisotropical layer 71 thereon, the first optical anisotropical layer 71 is subsequently transferred from the first substrate 61 to a second substrate (not shown), which is made from an isotropic material, such as cellulous acetate, that is much more expensive than the first substrate 61.

Figure 7:
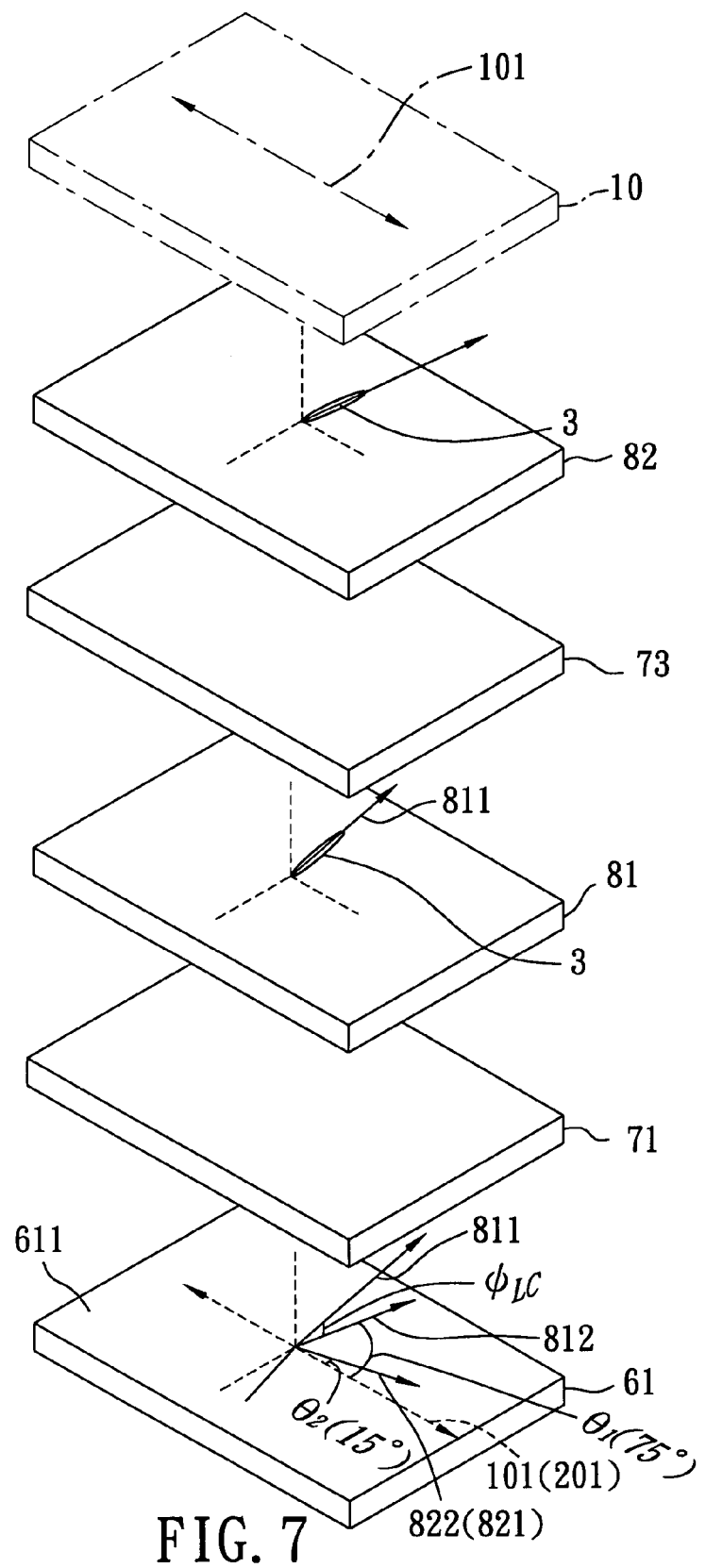
FIG. 7 is an exploded view of the second preferred embodiment of an optical device according to this invention.

FIG. 7 illustrates the second preferred embodiment of the optical device according to this invention. The optical device of this embodiment differs from the previous embodiment in that a second orienting film 73 and a second optical anisotropical layer 82 are further included. The second orienting film 73 is formed on the first optical anisotropical layer 81, is made from the orienting material, and is rubbed in a rubbing direction different from that of the first orienting film 71. The second optical anisotropical layer 82 is formed on the second orienting film 73, and is made from the liquid crystal material of the rod-like molecules that are spatially affected and oriented by the second orienting film 73 in a predetermined orientation 821. The polarizer 10 is attached to the second optical anisotropical layer 82. The absorbing axis 101 of the polarizer 10 forms a first oriented angle $\theta_1$ with the projection of the orientation 811 of the rod-like molecules of the first optical anisotropical layer 81 on the plane 611 of the first substrate 61, and a second oriented angle $\theta_2$ with the projection 822 of the orientation 821 of the rod-like molecules of the second optical anisotropical layer 82 on the plane 611 of the first substrate 61. In this embodiment, the first and second oriented angles $\theta_1$, $\theta_2$ are 75 degrees and 15 degrees, respectively, so that the first and second optical anisotropical layers 81, 82 generate a phase difference of $\lambda/4$ and a phase difference of $\lambda/2$ at a wavelength of 550 nm, respectively, where $\lambda$ is the wavelength of an incident light traveling through the optical device.

Figure 8:
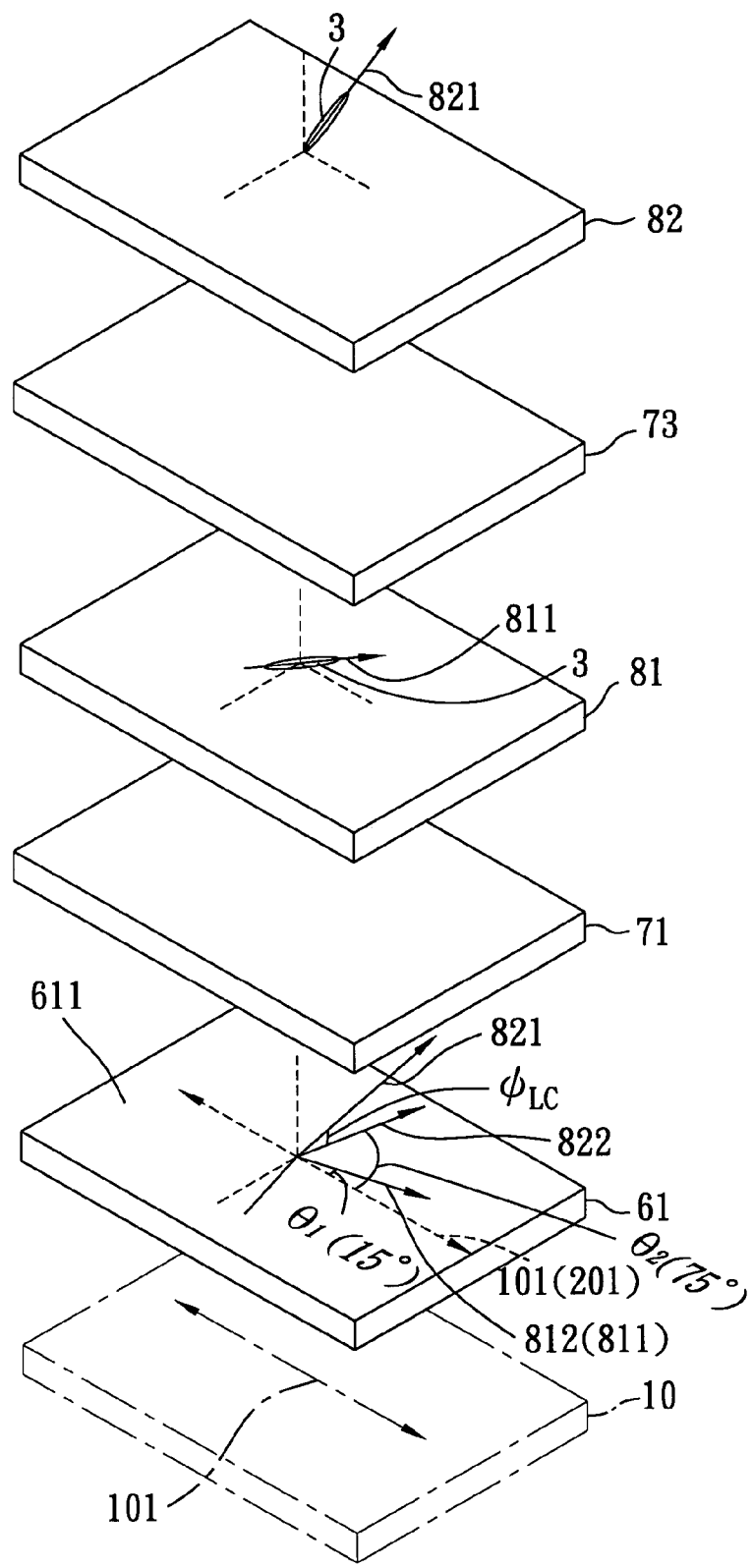
FIG. 8 is an exploded view of the third preferred embodiment of an optical device according to this invention.

FIG. 8 illustrates the third preferred embodiment of the optical device according to this invention. The optical device of this embodiment differs from the second embodiment in that the first and second oriented angles $\theta_1$, $\theta_2$ are 15 degrees and 75 degrees, respectively, so that the first and second optical anisotropical layers 81, 82 generate a phase difference of $\lambda/2$ and a phase difference of $\lambda/4$ at a wavelength of 550 nm, respectively. The polarizer 10 is attached to the first substrate 61.

Figure 9:
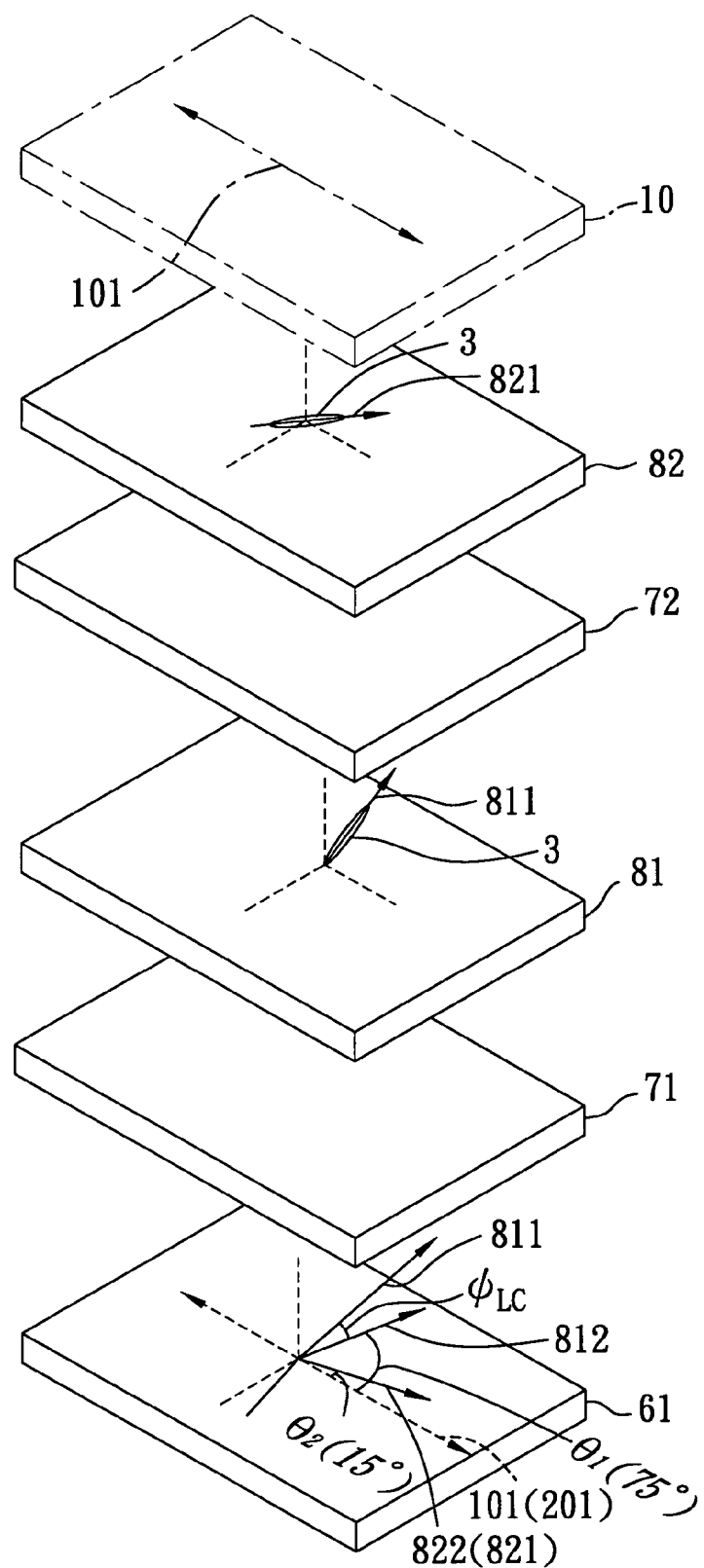
FIG. 9 is an exploded view of the fourth preferred embodiment of an optical device according to this invention.

FIG. 9 illustrates the fourth preferred embodiment of the optical device according to this invention. The optical device of this embodiment differs from the first preferred embodiment in that an isotropic adhesive layer 72 and a second optical anisotropical layer 82 are further included. The isotropic adhesive layer 72 is made from an isotropic material. The second optical anisotropical layer 82 is formed on the isotropic adhesive layer 72, and is made from the liquid crystal material of the rod-like molecules that are spatially affected and oriented in a predetermined orientation 821. The polarizer 10 is attached to the second optical anisotropical layer 82. The absorbing axis 101 of the polarizer 10 forms a first oriented angle $\theta_1$ with the projection of the orientation 811 of the rod-like molecules of the first optical anisotropical layer 81 on the plane 611 of the first substrate 61, and a second oriented angle $\theta_2$ with the projection 822 of the orientation 821 of the rod-like molecules of the second optical anisotropical layer 82 on the plane 611 of the first substrate 61. In this embodiment, the first and second oriented angles $\theta_1$, $\theta_2$ are 75 degrees and 15 degrees, respectively, so that the first and second optical anisotropical layers 81, 82 generate a phase difference of $\lambda/4$ and a phase difference of $\lambda/2$ at a wavelength of 550 nm, respectively.

Figure 10:
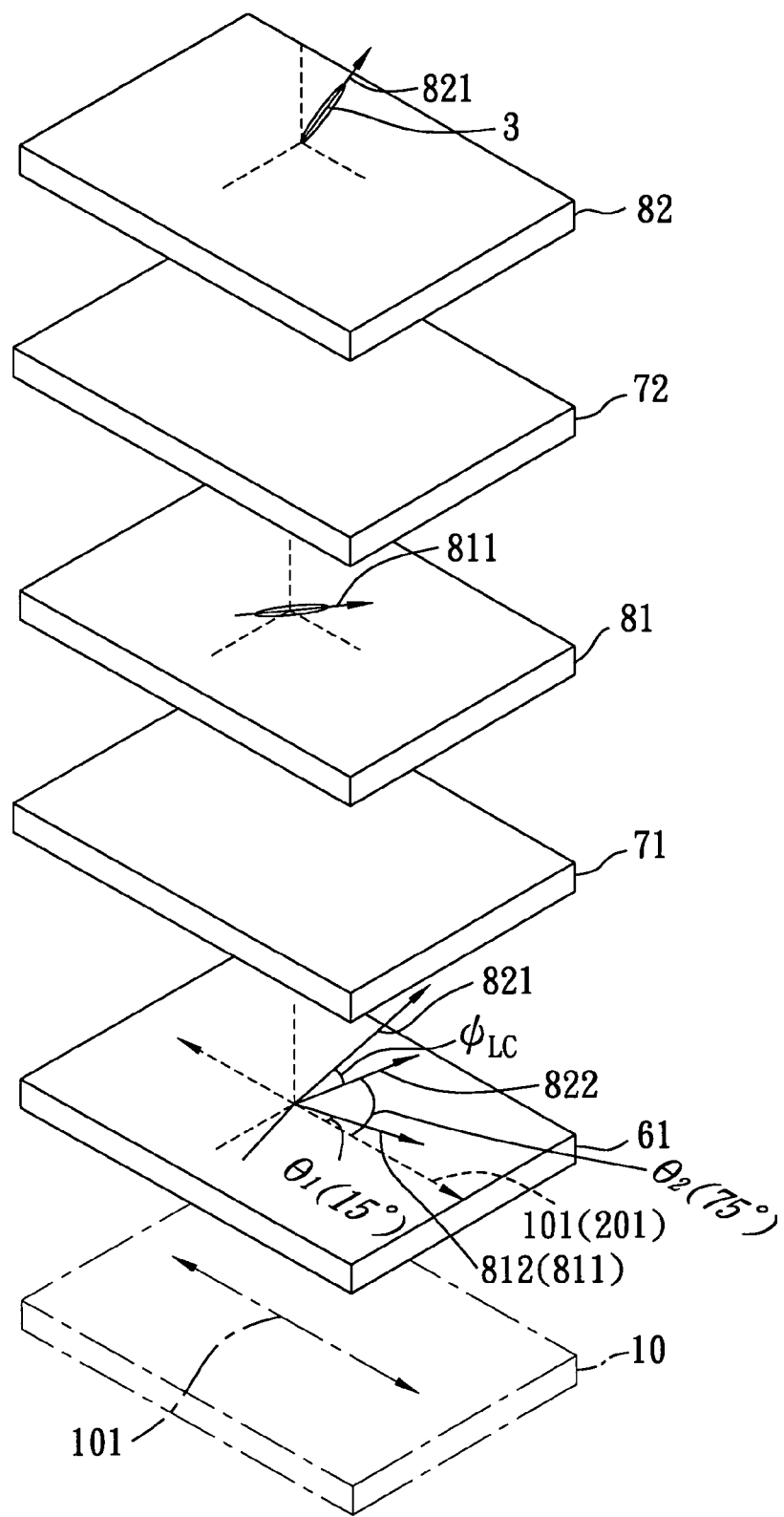
FIG. 10 is an exploded view of the fifth preferred embodiment of an optical device according to this invention.

FIG. 10 illustrates the fifth preferred embodiment of the optical device according to this invention. The optical device of this embodiment differs from the fourth embodiment in that the first and second oriented angles $\theta_1$, $\theta_2$ are 15 degrees and 75 degrees, respectively, so that the first and second optical anisotropical layers 81, 82 generate a phase difference of $\lambda/2$ and a phase difference of $\lambda/4$ at a wavelength of 550 nm, respectively. The polarizer 10 is attached to the first substrate 61.

Figure 11:
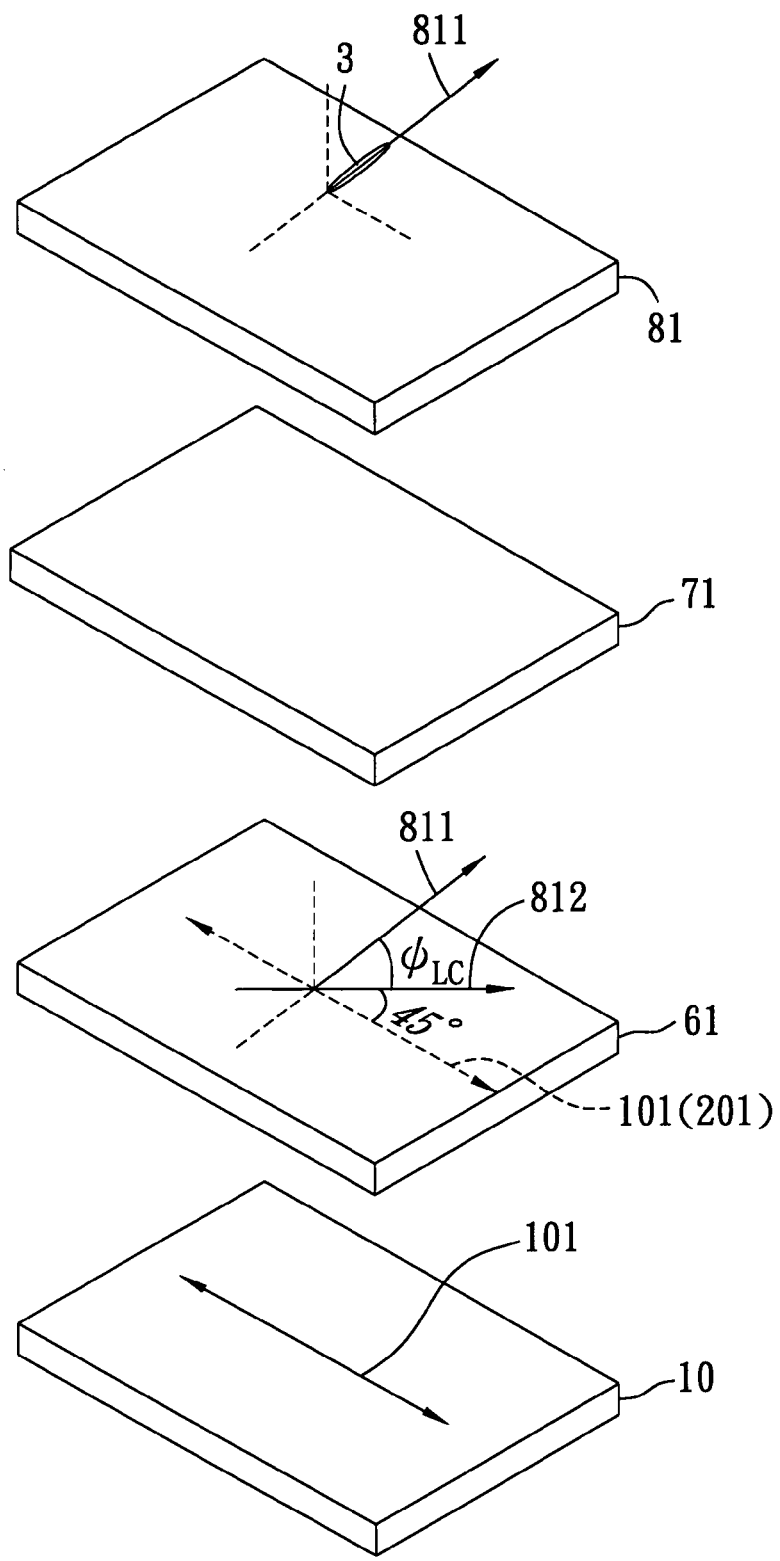
FIG. 11 is an exploded view of the sixth preferred embodiment of an optical device according to this invention.

FIG. 11 illustrates the sixth preferred embodiment of the optical device according to this invention. The optical device of this embodiment is similar to the first preferred embodiment, except that the optical device further includes a polarizer 10, and serves as a circular polarizer. In this embodiment, the first substrate 61 is made from isotropic material, such as cellulous acetate. Moreover, the first oriented angle is 45 degrees so that the first optical anisotropical layer 81 generates a phase difference of $\lambda/4$ at a wavelength of 550 nm.

Conventional circular polarizers normally include a quarter wave plate, an iodine-doped polyvinyl alcohol film, and two cellulous acetate (TAC) films. However, using the method of this invention, only one cellulous acetate film (i.e., the substrate 61) is required in the circular polarizer of this invention, which results in a reduction in the thickness of the circular polarizer and in lowering manufacturing costs.

Figure 12:
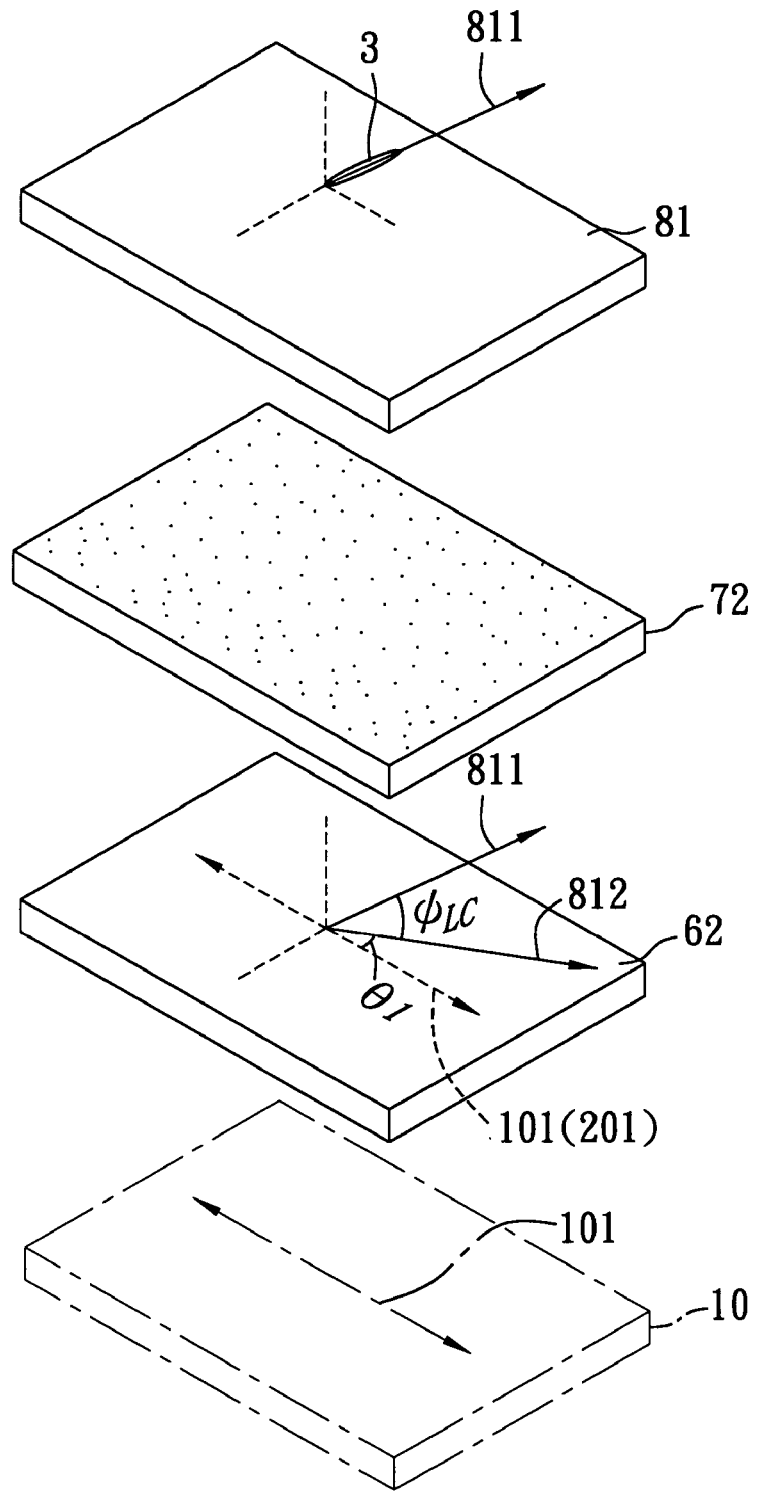
FIG. 12 is an exploded view of the seventh preferred embodiment of an optical device according to this invention.

FIG. 12 illustrates the seventh preferred embodiment of the optical device according to this invention. The optical device of this embodiment includes a second substrate 62, an isotropic adhesive layer 72 formed on the second substrate 62, and a first optical anisotropical layer 81 formed on the isotropic adhesive layer 72. The optical device can be attached to a polarizer 10 which is to be connected to the second substrate 62. The optical device of this embodiment can be obtained by transferring the first optical anisotropical layer 71 of the optical device of FIG. 6 from the first substrate 61 to the second substrate 62 using the isotropic adhesive layer 72.

Figure 13:
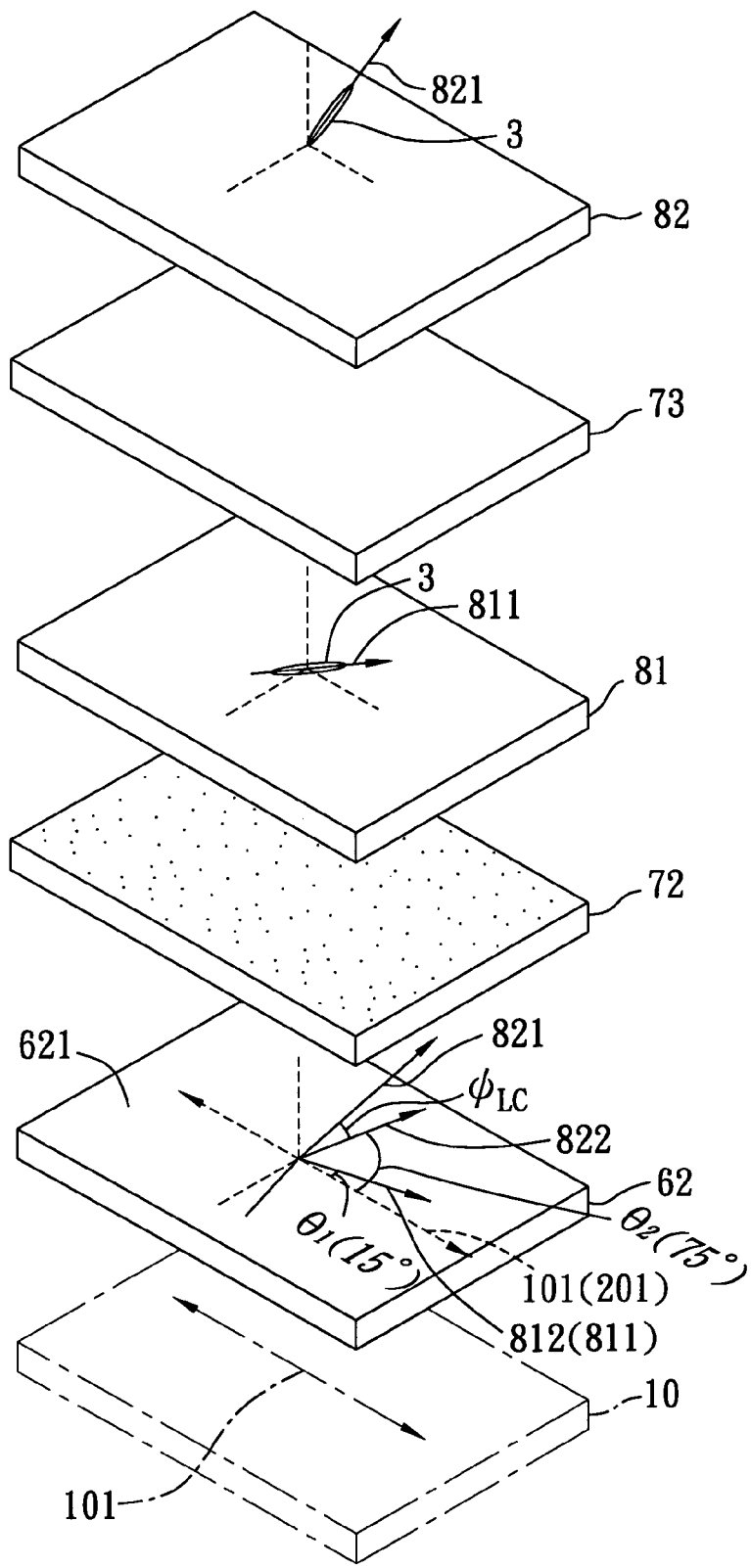
FIG. 13 is an exploded view of the eighth preferred embodiment of an optical device according to this invention.

FIG. 13 illustrates the eighth preferred embodiment of the optical device according to this invention. The optical device of this embodiment differs from the seventh preferred embodiment in that an orienting film 73 and a second optical anisotropical layer 82 are further included. The orienting film 73 is made from the orienting material used in the first preferred embodiment. The second optical anisotropical layer 82 is formed on the orienting film 73, and is made from the liquid crystal material of the rod-like molecules that are spatially affected and oriented by the orienting film 73 in a predetermined orientation 821. The absorbing axis 101 of the polarizer 10 forms a first oriented angle $\theta_1$ with the projection of the orientation 811 of the rod-like molecules of the first optical anisotropical layer 81 on a plane 621 defined by the second substrate 62, and a second oriented angle $\theta_2$ with the projection 822 of the orientation 821 of the rod-like molecules of the second optical anisotropical layer 82 on the plane 621 of the second substrate 62. In this embodiment, the first and second oriented angles $\theta_1$, $\theta_2$ are 15 degrees and 75 degrees, respectively, so that the first and second optical anisotropical layers 81, 82 generate a phase difference of $\lambda/2$ and a phase difference of $\lambda/4$ at a wavelength of 550 nm, respectively.

Figure 14:
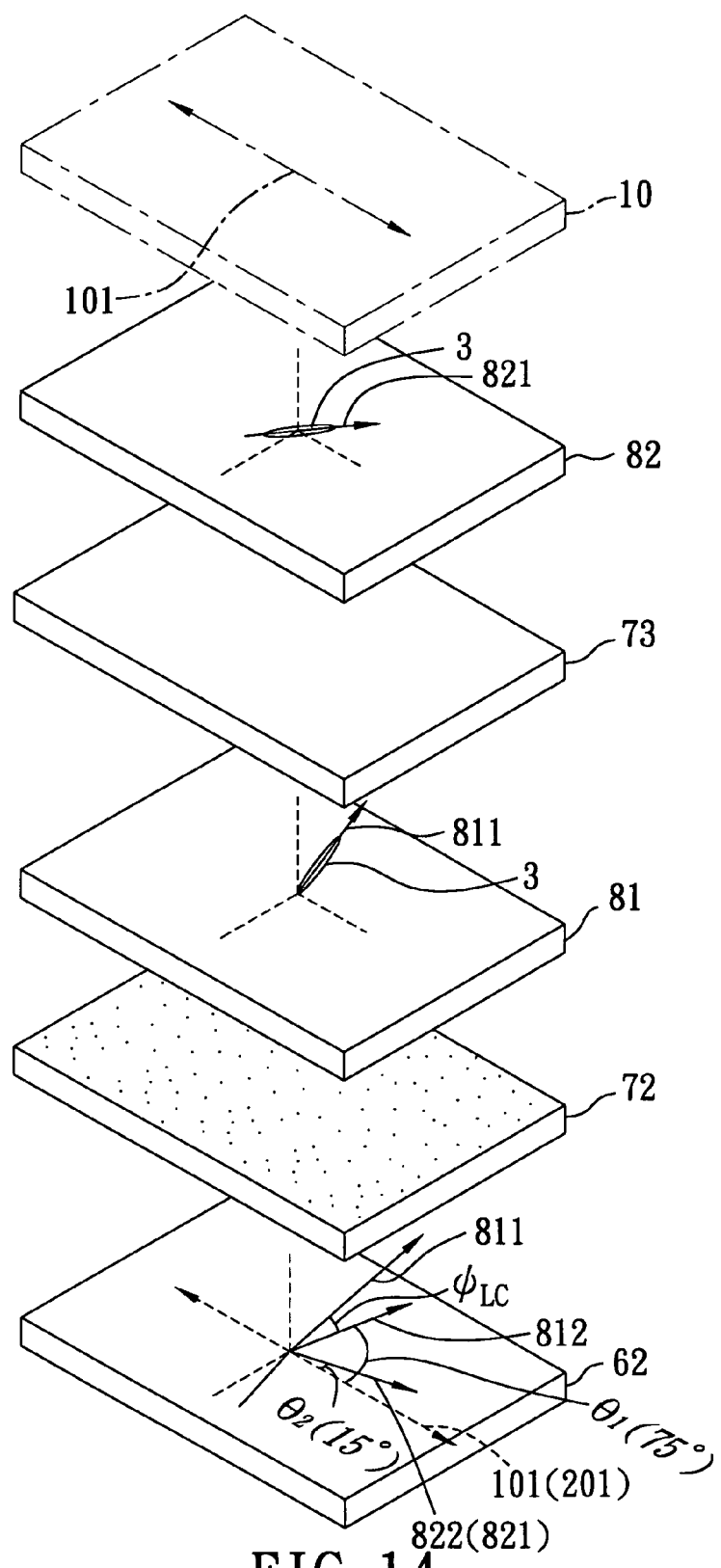
FIG. 14 is an exploded view of the ninth preferred embodiment of an optical device according to this invention.

FIG. 14 illustrates the ninth preferred embodiment of the optical device according to this invention. The optical device of this embodiment differs from the eighth preferred embodiment in that the first and second oriented angles $\theta_1$, $\theta_2$ are 75 degrees and 15 degrees, respectively, so that the first and second optical anisotropical layers 81, 82 generate a phase difference of $\lambda/4$ and a phase difference of $\lambda/2$ at a wavelength of 550 nm, respectively. Moreover, the polarizer 10 is to be attached to the second optical anisotropical layer 82 of this embodiment.

Figure 15:
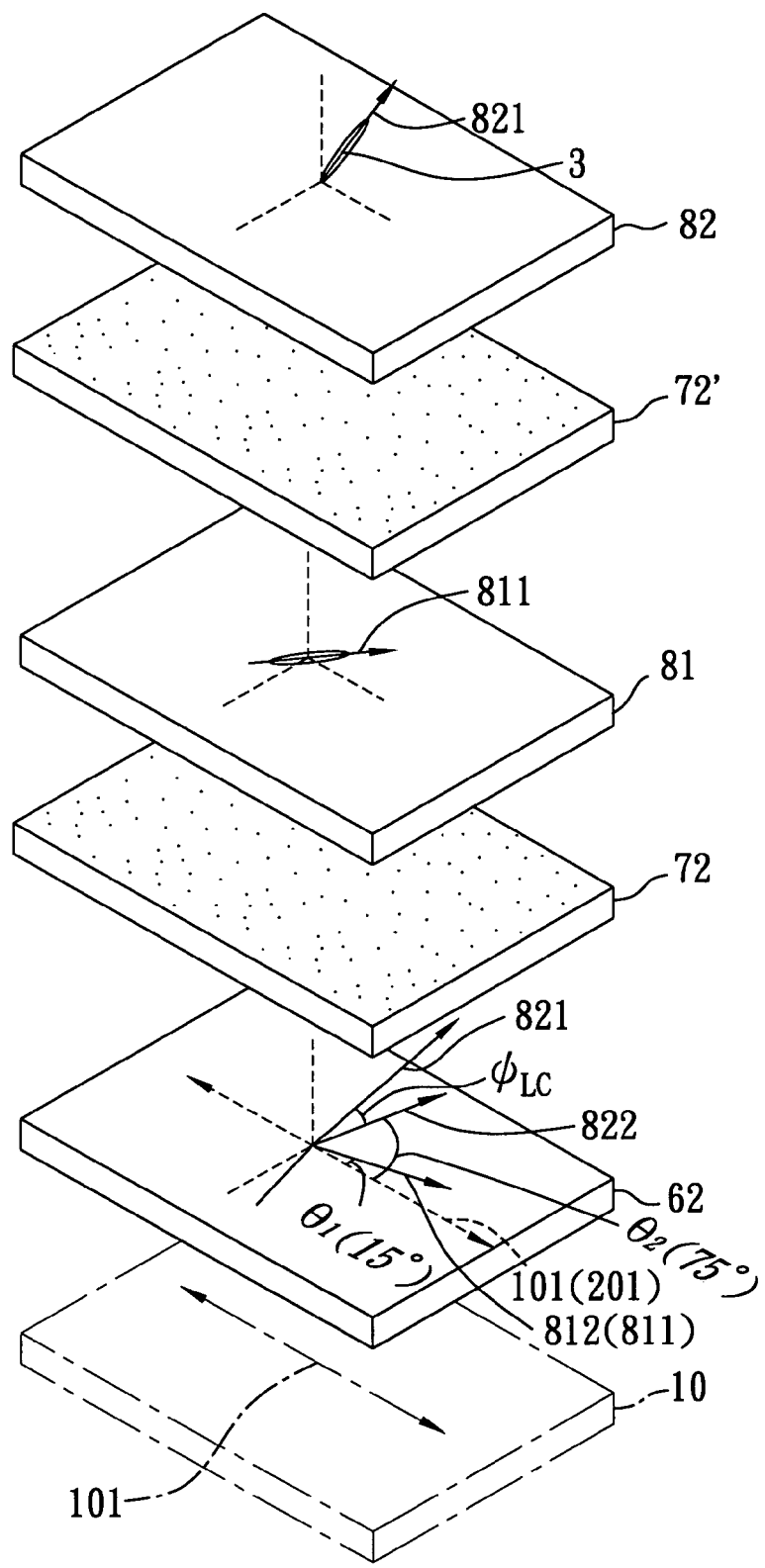
FIG. 15 is an exploded view of the tenth preferred embodiment of an optical device according to this invention.

FIG. 15 illustrates the tenth preferred embodiment of the optical device according to this invention. The optical device of this embodiment differs from the seventh preferred embodiment in that a second isotropic adhesive layer 72' which is made from the isotropic material and which is formed on the first optical anisotropical layer 81, and a second optical anisotropical layer 82 that is bonded to the first optical anisotropical layer 81 through the second isotropic adhesive layer 72' are included. The second optical anisotropical layer 82 is made from the liquid crystal material of the rod-like molecules that are oriented in a predetermined orientation. In this embodiment, the first and second oriented angles $\theta_1$, $\theta_2$ are 15 degrees and 75 degrees, respectively, so that the first and second optical anisotropical layers 81, 82 generate a phase difference of $\lambda/2$ and a phase difference of $\lambda/4$ at a wavelength of 550 nm, respectively.

Figure 16:
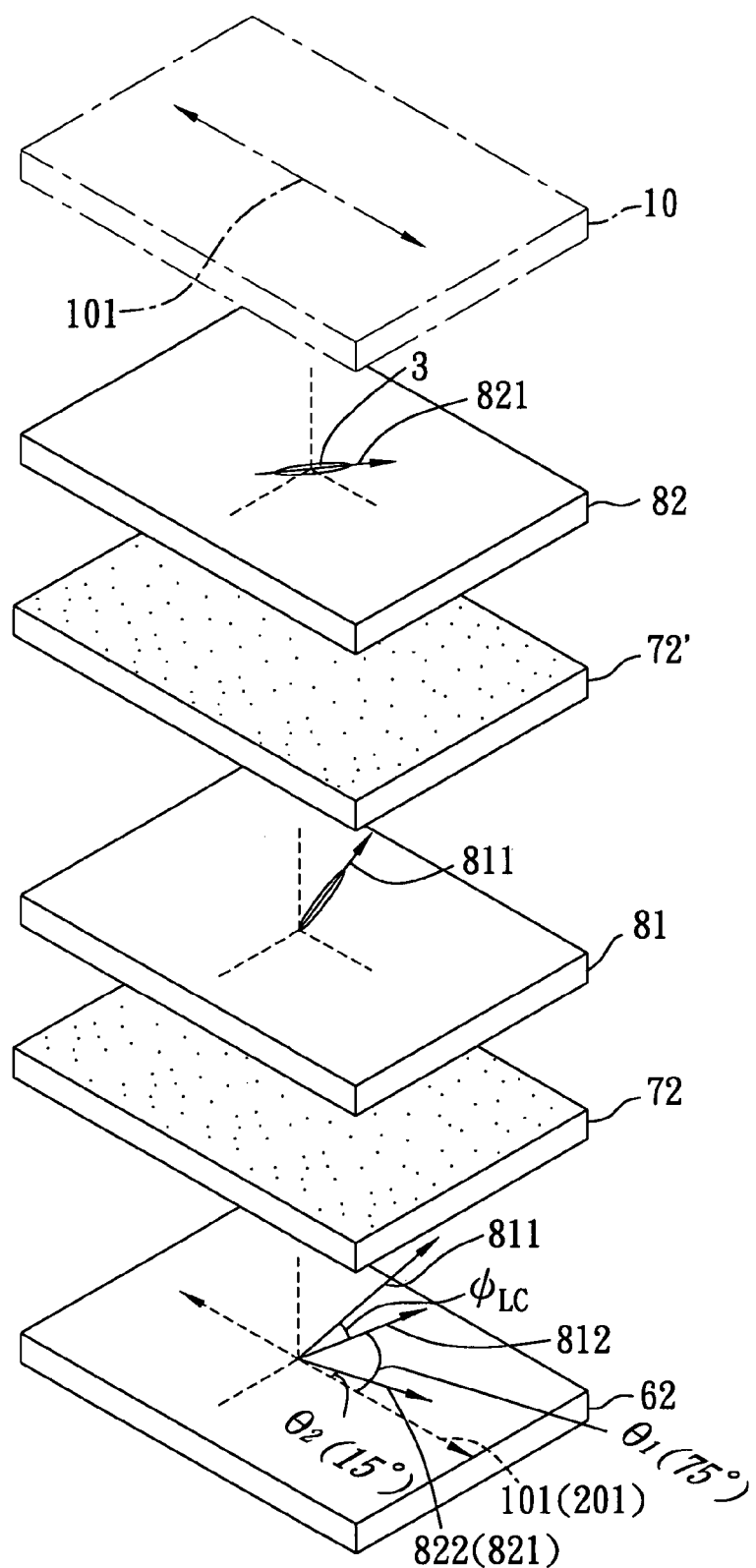
FIG. 16 is an exploded view of the eleventh preferred embodiment of an optical device according to this invention.

FIG. 16 illustrates the eleventh preferred embodiment of the optical device according to this invention. The optical device of this embodiment differs from the tenth preferred embodiment in that the first and second oriented angles $\theta_1$, $\theta_2$ are 75 degrees and 15 degrees, respectively, so that the first and second optical anisotropical layers 81, 82 generate a phase difference of $\lambda/4$ and a phase difference of $\lambda/2$ at a wavelength of 550 nm, respectively. Moreover, the polarizer 10 is to be attached to the second optical anisotropical layer 82 of this embodiment.

Figure 17:
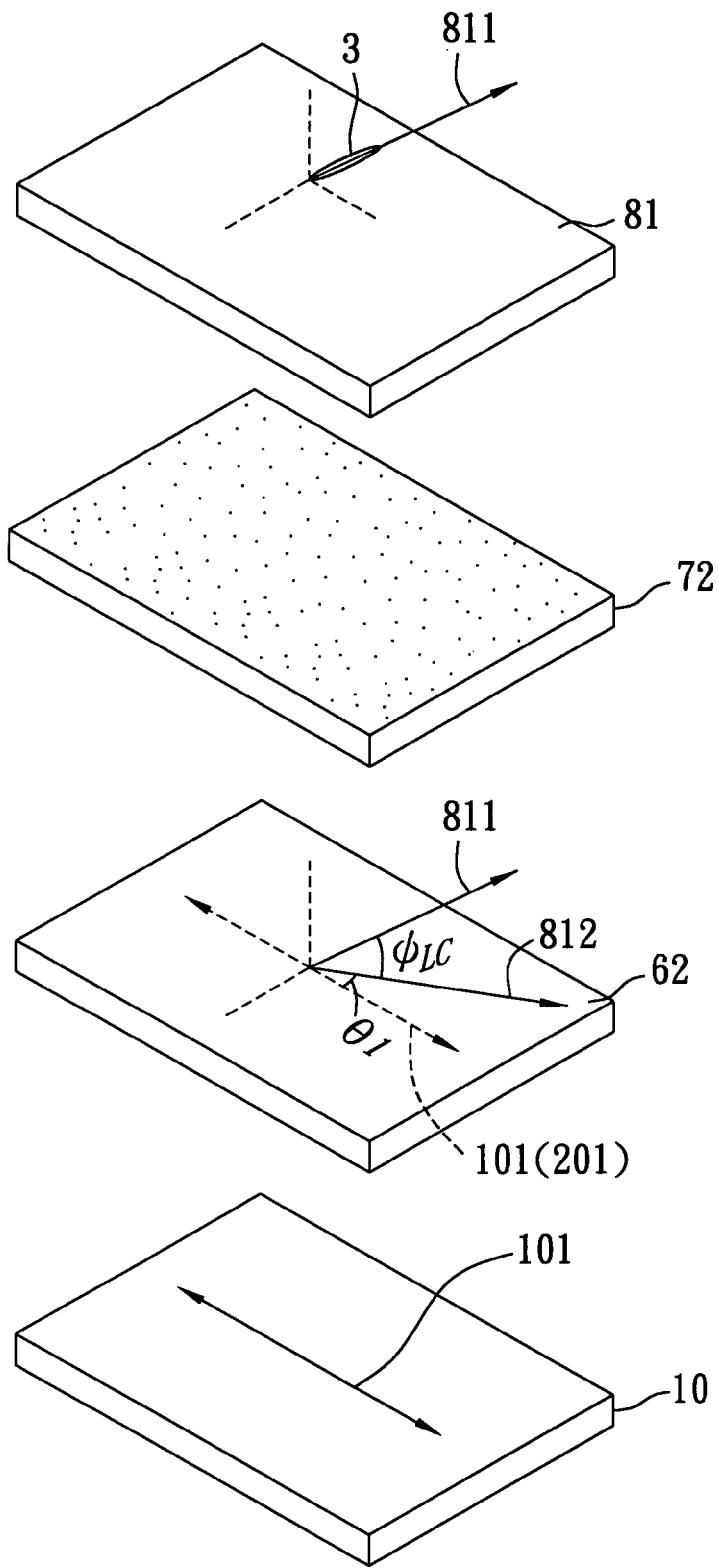
FIG. 17 is an exploded view of the twelfth preferred embodiment of an optical device according to this invention.

FIG. 17 illustrates the twelfth preferred embodiment of the optical device according to this invention. The optical device of this embodiment is similar to the seventh preferred embodiment, except that the optical device further includes a polarizer 10, and serves as a circular polarizer. Moreover, the first oriented angle is 45 degrees so that the first optical anisotropical layer 81 generates a phase difference of $\lambda/4$ at a wavelength of 550 nm.

Figure 18:
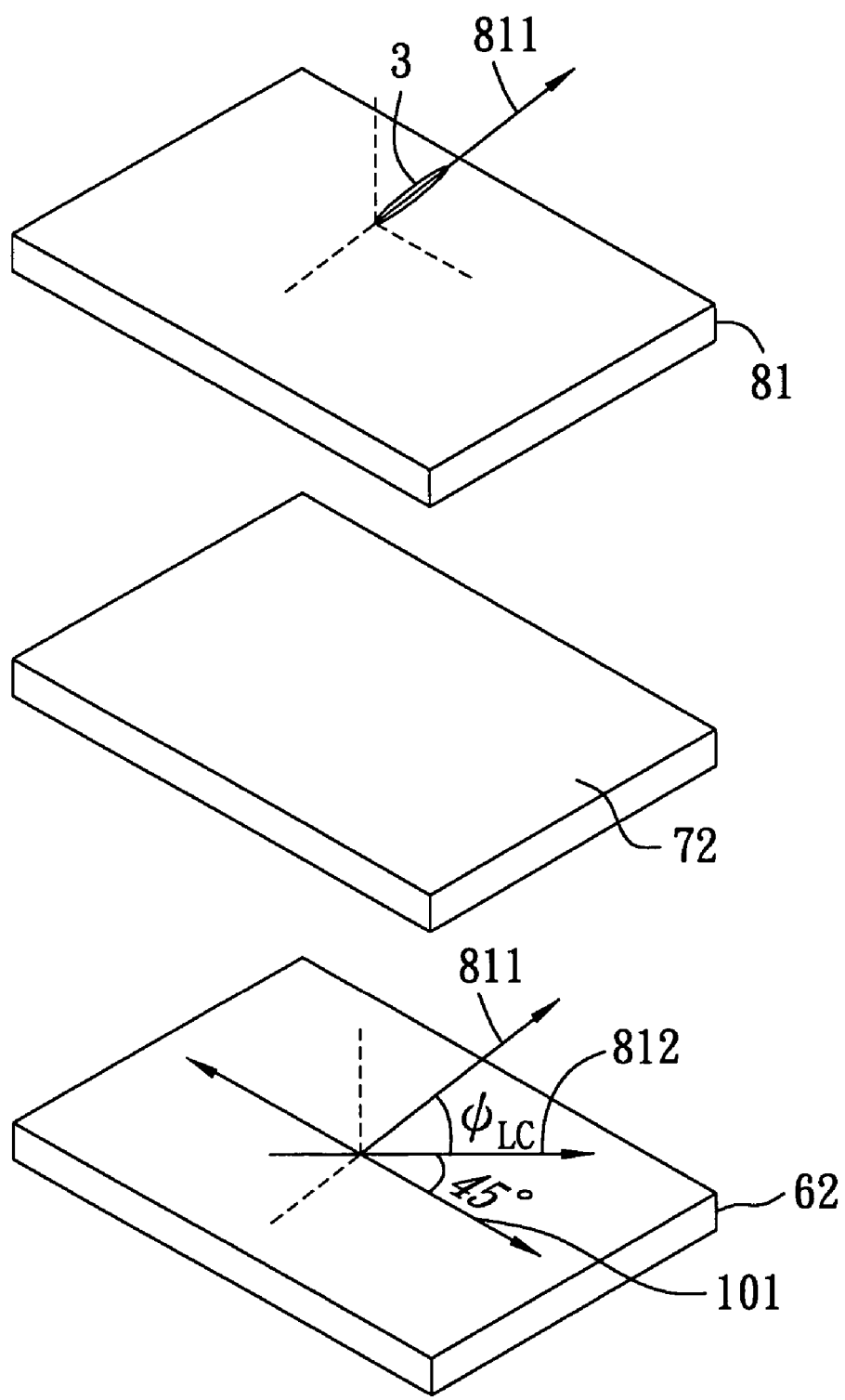
FIG. 18 is an exploded view of the thirteenth preferred embodiment of an optical device according to this invention.

FIG. 18 illustrates the thirteenth preferred embodiment of the optical device according to this invention. The optical device of this embodiment is similar to the seventh preferred embodiment, except that the substrate 62 is itself a polarizer.

The optical device of this invention can be produced in the form of a roll or a rolled film. The thickness of the optical device preferably ranges from 0.01 to 0.5 μm, and is more preferably ranges from 0.05 to 0.25 μm.

The first substrate 61 can be made from a non-isotropic material, such as polyethylene terephthalate (PET), polyethylene, and polypropylene, or from an isotropic material, such as cellulous esters, polycarbonate, polysulfone, polycycloolefin, polyether sulfone, polyacrylate, and polymethacrylate. Preferably, the isotropic material has a transparency greater than 80%, a $R_e400/R_e700$ ratio less than 1.2, and a phase retardation $R_e$ less than 20 nm, and more preferably, has a phase retardation $R_e$ less than 10 nm. Preferably, the first substrate 61 is made from cellulous acetate.

The first and second orienting films 71, 73 can be made from hardened or non-hardened orienting material. Preferably, the first and second orienting films 71, 73 are made from hardened orienting material which can provide a better weather resistance, and have a layer thickness ranging from 0.01 to 0.5 μm.

Referring back to FIG. 3, the molecular structure 4 of each of the molecules of the orienting material of the first orienting film 71 is helical in shape. Preferably, each of the molecules of the orienting material includes a polypeptide with a helical structure. More preferably, the orienting material is a mixture of single or multi-stranded polypeptides, and most preferably the orienting material is gelatin, such as gelatin from porcine, bovine, or fish skin, or mixtures thereof.

The first orienting film 71 is formed on the first substrate 61 by applying a solution containing the orienting material to the first substrate 61 and subsequently drying the applied solution on the first substrate 61. Preferably, the solution is an aqueous gelatin that contains 0.05 to 20 wt % of gelatin, and more preferably, contains 2 to 10 wt % of gelatin. The solution can further contains an alcohol having from 1 to 6 carbon atoms.

The liquid crystal film of the rod-like molecules 3 applied on the first orienting film 71 for forming the first optical anisotropical layer 81 is preferably hardened during step (c). A hardening agent and an acid for characterizing hardening reaction are added in the solution for the hardening of the liquid crystal film. The hardening operation is conducted at a temperature ranging from 70 to 90° C., followed by radiating the liquid crystal film with UV light.

Suitable hardening agent is selected from the group consisting of aldehydes, N-methylol compounds, dioxane derivatives, carboxyl group-containing compounds that can be used for initiating cross-linking reaction, active vinyl compounds, active halide, isooxazoles, and dialdehyde starch. Preferably, the hardening agent is aldehydes, such as glutaraldehyde.

The amount of the hardening agent used in the solution preferably ranges from 0.1 to 20 wt %, and more preferably ranges from 0.5 to 15 wt %, based on the weight of the gelatin in the solution.

Preferably, the acid used in the solution is acetic acid.

Preferably, the drying temperature ranges from 50 to 95° C.

Optionally, the orienting material may further contain polyvinyl alcohol. The polyvinyl alcohol preferably has a polymerization degree ranging from 100 to 3000, and more preferably ranging from 100 to 1000, and most preferably ranging from 100 to 500, and a saponification degree ranging from 70 to 10 mol %, more preferably ranging from 80 to 100 mol %, and most preferably ranging from 90 to 100 mol %.

It is known in the art that, for the same amount of a pile impression, the higher the rotating speed of the rubbing roller 300, the greater stretching extent will be for the molecular structure 4 of each of the molecules of the orienting material, and that for the same rotating speed, the larger the pile impression, the smaller will be the angle $\theta_T$ between the first and second axes 5, 41.

The rubbing roller 300 includes rubbing sheet that is made from a material, such as rubber sheet, nylon sheet, polyester sheet, nylon fiber, rayon, polyester fiber (velvet sheet), paper sheet, gauze sheet, and felt sheet.

Figure 19:
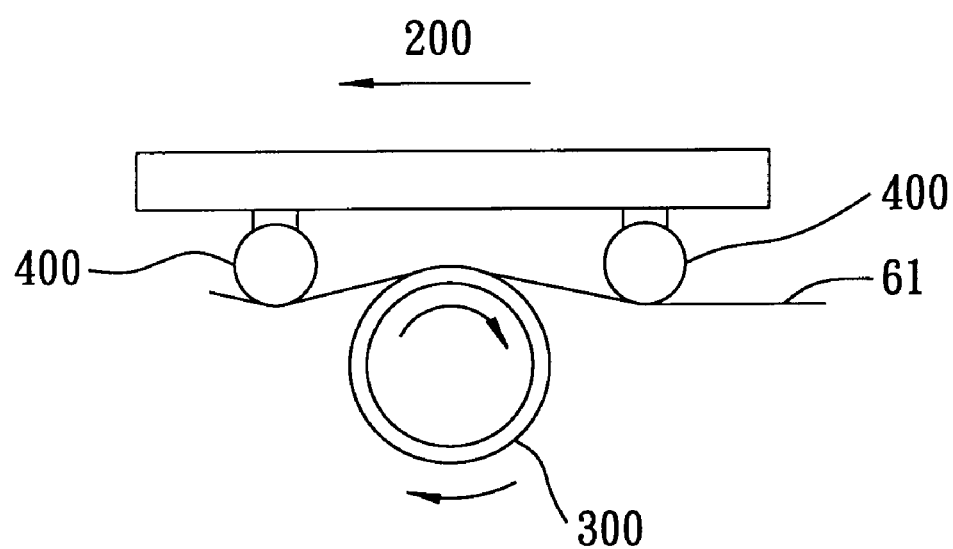
FIG. 19 is a schematic view to illustrate how a substrate is conveyed and rubbed using a roller set according to the preferred embodiment of the method of this invention.

FIG. 19 illustrates how the first substrate 61 is conveyed by a pair of conveying rollers 400, and how the substrate 61 is rubbed by the rubbing roller 300.

The rotating speed of the rubbing roller 300 preferably ranges from 100 to 1500 rpm. The pile impression of the rubbing roller 300 preferably ranges from 0.05 to 0.5 mm.

Conventionally, the rubbing roller is required to be rotated in a direction against the movement of the substrate so as to achieve the desired rubbing effect. However, the orienting material used for the first orienting film 71 permits achievement of the desired rubbing effect even when the rubbing roller 300 is rotated in an opposite direction.

When gelatin is used as the orienting material, and the rubbing angle $\theta_R$ is set to 0 degree, by adjusting the rubbing parameters and by varying the composition of the solution of the orienting material, a range of from 30 to 80 degrees can be achieved for the oriented angle $\theta_1$ of the thus-formed first anisotropical layer 81. However, when gelatin and polyvinyl alcohol are used as the orienting material, and the rubbing angle $\theta_R$ is set to 0 degree, a range of from 0 to 30 degrees can be achieved for the oriented angle $\theta_1$ of the thus-formed first anisotropical layer 81.

By adjusting the rubbing angle $\theta_R$, a range of from 0 to 90 degrees can be easily achieved for the thus-formed oriented angle $\theta_1$ of the first anisotropical layer 81.

The liquid crystal material suitable for the first optical anisotropical layer 81 can be the compounds disclosed in U.S. Patent Application Publication No. U.S. 2004/0100600 A1.

Referring back to FIG. 7, in addition to the steps (a) to (c) described hereinabove, the method for forming the optical device of the second preferred embodiment further includes the steps: (d) applying a solution containing the orienting material to the first optical ansiotropical layer 81; (e) drying the applied solution so as to form the second orienting film 73 on the first optical anisotropical layer 81; (f) rubbing the second orienting film 73 on the first optical anisotropical layer 81; (g) forming a second liquid crystal film of rod-like molecules on the second orienting film 73 so as to form a second optical anisotropical layer 82 on the second orienting film 73; and (h) hardening the second liquid crystal film on the second orienting film 73.

Figure 20:
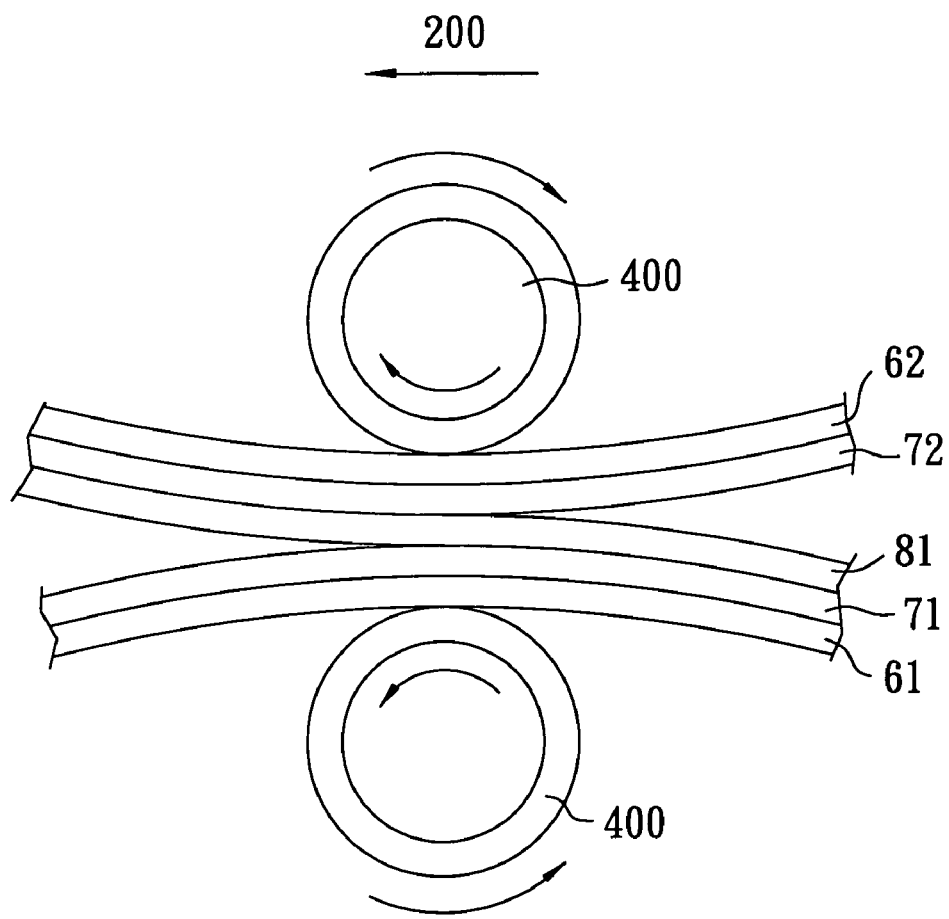
FIG. 20 is a schematic view to illustrate how an anisotropical layer is transferred from a first substrate to a second substrate according to the preferred embodiment of the method of this invention.

Referring back to FIGS. 6, 12, and 20, the first optical anisotropical layer 81 can be transferred from the first substrate 61 (see FIG. 6) to the second substrate 62 (see FIG. 12) by using an isotropic adhesive, which forms the isotropic adhesive layer 72. The transferring operation is conducted by applying the isotropic adhesive to the second substrate 62, attaching the second substrate 62 to the first optical anisotropical layer 81 through the isotropic adhesive, followed by separating the first optical anisotropical layer 81 from the first orienting film 71 (see FIG. 20). Alternatively, the isotropic adhesive can be applied to the first optical anisotropical layer 81 instead of being applied to the second substrate 62.

In order to permit separation of the first optical anisotropical layer 81 from the first orienting film 71, a surface 611 of the first substrate 61, which is the one bonded to the first orienting film 71, is subjected to corona treatment prior to the formation of the first orienting film 71 on the surface 611 of the first substrate 61 so as to enhance the bonding strength between the surface 611 of the first substrate 61 and the first orienting film 71 and so as to facilitate separation of the first optical anisotropical layer 81 from the first orienting film 71.

The aforesaid isotropic adhesive can be general photosensitive adhesives or pressure-sensitive adhesives.

Referring back to FIGS. 7 and 13, the first and second optical anisotropical layers 81, 82 can be transferred from the first substrate 61 (see FIG. 7) to the second substrate 62 (see FIG. 13) in a similar way as shown in FIGS. 6 and 12 by using an isotropic adhesive, which forms the isotropic adhesive layer 72, and the corona treatment.

Hence, in order to permit separation of the first and second optical anisotropical layers 81, 82 from the first orienting film 71, a surface of the first optical anisotropical layer 81, which is distal from the first orienting film 71, is subjected to corona treatment prior to the formation of the second orienting film 73 on the surface of the first optical anisotropical layer 81 so as to enhance the bonding strength between the surface of the first optical anisotropical layer 81 and the second orienting film 73, and a surface of the second orienting film 73, which is distal from the first optical anisotropical layer 81, is also subjected to corona treatment prior to the formation of the second optical anisotropical layer 82 on the second orienting film 73 so as to enhance the bonding strength between the surface of the second orienting film 73 and the second optical anisotropical layer 82 and so as to facilitate separation of the first and second optical anisotropical layers 81, 82 from the first orienting film 71.

In a similar way, referring back to FIGS. 9 and 15, and FIGS. 10 and 16, the first and second optical anisotropical layers 81, 82 can be transferred from the first substrate 61 to the second substrate 62 using the abovementioned transfer techniques.

EXAMPLES

This invention will now be described in greater detail with reference to the following Examples.

Materials and Equipment

The following are details of the materials and equipment used in the following Examples.

1. fish gelatin: purchased from Norland Co., catalogue No.: P/NFG-04.

2. porcine gelatin: purchased from Sigma Co., product name: Gelatin type A from porcine skin approx. 300 bloom or 175 bloom.

3. bovine gelatin: purchased from Sigma Co., product name: Gelatin type B from bovine skin approx. 225 bloom.

4. polyvinyl alcohol: purchased from Taiwan ChangChun Plastics Co., product name: BP-05, polymerization degree: 500, saponification degree: 86-89 mol %.

5. rod-like liquid crystal material: purchased from Merk Co., catalogue No.: RMS03011 for O-plate, and RMS03001 for A-plate.

6. cellulous ester: purchased from Konica Co.

7. rubbing machine having a rubbing roller with rayon rubbing sheet.

Example 1

Preparation of the Optical Device

The optical device for Example 1 was prepared according to the following consecutive steps:

(1) preparing an aqueous orienting solution by adding 0.5 g of the fish gelatin into 100 ml of water which was kept at a temperature of 60° C.;

(2) applying the orienting solution to a PET film using gravure techniques to form a 0.2 μm thick orienting coating on the PET film;

(3) baking the orienting coating at a temperature of 90° C. for about 3 minutes;

(4) rubbing the baked orienting coating using the rubbing roller under a rubbing angle $\theta_R$ equal to 0 degree, a pile impression of 0.3 mm, and a roller rotating speed of 600 rpm so as to form the orienting coating into an orienting film;

(5) applying the rod-like liquid crystal material (RMS03011) to the orienting film so as to form a 1.1-1.5 μm thick liquid crystal coating on the orienting film;

(6) heating the liquid crystal coating at a temperature of about 80° C. for about one minute for alignment of the rod-like liquid crystal molecules on the orienting film so as to form a wet film; and (7) radiating the wet film with a UV exposure machine under a power of 0.2 J/cm$^2$ so as to harden the rod-like liquid crystal molecules and so as to form an optical anisotropical layer on the orienting film. The optical device thus-formed was in the form of a roll.

Measuring of the Oriented Angle

The oriented angle $\theta$ of the optical anisotropical layer obtained from Example 1 was measured using an Ellipsometer, and was about 60 degrees.

Example 2

This Example differs from Example 1 in that the orienting solution of this Example was prepared by adding 0.35 g porcine skin gelatin (300 bloom), 0.23 g fish gelatin, 0.1 g acetic acid, and 0.1 g glutaraldehyde (concentration: 25 wt %) into a mixture of 15 g water, 15 g methanol, and 8 g acetone. The oriented angle $\theta$ of the optical anisotropical layer obtained from Example 2 was measured, and was 40 degrees.

Example 3

This Example differs from Example 1 in that the orienting solution of this Example was prepared by adding 2 g porcine skin gelatin (300 bloom), 1 g salicylic acid, and 3.5 g formaldehyde (concentration: 37 wt %) into a mixture of 10 g water, 10 g methanol, and 25 g acetone. The oriented angle $\theta$ of the optical anisotropical layer obtained from Example 3 was measured, and was 40 degrees.

Example 4

This Example differs from Example 1 in that the orienting solution of this Example was prepared by adding 0.5 g bovine skin gelatin, 0.5 g salicylic acid, and 2.5 g formaldehyde (concentration: 10 wt %) into a mixture of 5 g water, 5 g methanol, and 10 g acetone. The orienting coating was baked at a temperature of 80° C. Moreover, the RMS03001 was used as the rod-like liquid crystal material. The oriented angle $\theta$ of the optical anisotropical layer obtained from Example 4 was measured, and was 45 degrees, which permits the use of the optical device of this Example as a quarter wave plate.

Example 5

This Example differs from Example 1 in that the orienting solution of this Example was prepared by dissolving 0.5 g porcine skin gelatin (300 bloom) in 20 g water. The water was kept at a temperature of 65° C. during the dissolution of the gelatin. The roller rotating speed was 1400 rpm during the rubbing operation. The oriented angle $\theta$ of the optical anisotropical layer obtained from Example 5 was measured, and was 40 degrees.

Example 6

This Example differs from Example 5 in that the roller rotating speed was 1000 rpm during the rubbing operation. The oriented angle $\theta$ of the optical anisotropical layer obtained from Example 6 was measured, and was 50 degrees.

Example 7

This Example differs from Example 5 in that the roller rotating speed was 800 rpm during the rubbing operation. The oriented angle $\theta$ of the optical anisotropical layer obtained from Example 7 was measured, and was 60 degrees.

Example 8

This Example differs from Example 5 in that the roller rotating speed was 200 rpm during the rubbing operation. The oriented angle $\theta$ of the optical anisotropical layer obtained from Example 8 was measured, and was 70 degrees.

Example 9

This Example differs from Example 1 in that the orienting solution of this Example was prepared by adding 0.5 g bovine skin gelatin, 0.25 g acetic acid, and 5 g formaldehyde (concentration: 10 wt %) into a mixture of 5 g water, 4.5 g methanol, and 3 g acetone. In addition, the orienting coating was baked at a temperature of 85° C. The oriented angle $\theta$ of the optical anisotropical layer obtained from Example 9 was measured, and was 75 degrees.

Example 10

This Example differs from Example 1 in that the orienting solution of this Example was prepared by adding 0.5 g bovine skin gelatin and 0.2 g acetic acid into a mixture of 10 g water and 5 g methanol. In addition, the orienting coating was baked at a temperature of 85° C. The oriented angle $\theta$ of the optical anisotropical layer obtained from Example 10 was measured, and was 80 degrees.

Example 11

This Example differs from Example 1 in that the orienting solution of this Example was prepared by adding 0.5 g bovine skin gelatin, 1 g polyvinyl alcohol (10 wt %), 0.2 g acetic acid, and 2.5 g formaldehyde (concentration: 10 wt %) into a mixture of 10 g water, 5 g methanol, and 5 g acetone. In addition, the orienting coating was baked at a temperature of 85° C. The oriented angle $\theta$ of the optical anisotropical layer obtained from Example 11 was measured, and was 0 degree.

Example 12

This Example differs from Example 1 in that the orienting solution of this Example was prepared by dissolving 0.5 g bovine skin gelatin in 15 g water under a temperature of 65° C., followed by adding 0.1 g polyvinyl alcohol (10 wt %), 0.1 g acetic acid, 0.1 g glutaraldehyde (concentration: 37 wt %), 5 g methanol, and 8 g acetone into the aqueous gelatin solution. The oriented angle θ of the optical anisotropical layer obtained from Example 12 was measured, and was 3 degrees.

Example 13

This Example differs from Example 1 in that the orienting solution of this Example was prepared by dissolving 0.5 g bovine skin gelatin in 15 g water under a temperature of 65° C., followed by adding 0.05 g polyvinyl alcohol (10 wt %), 0.1 g acetic acid, 5 g formaldehyde (concentration: 10 wt %), 5 g methanol, and 7 g acetone into the aqueous gelatin solution. Moreover, the RMS03001 was used as the rod-like liquid crystal material. The oriented angle θ of the optical anisotropical layer obtained from Example 13 was measured, and was 15 degrees.

Example 14

This Example differs from Example 1 in that the orienting solution of this Example was prepared by dissolving 0.5 g porcine skin gelatin (300 bloom) in a mixture of 50 g water, 13 g methanol, and 18 g acetone under a temperature of 65° C. The rubbing operation was conducted under a rubbing angle $\theta_R$ of 30 degrees and a roller rotating speed of 300 rpm. The oriented angle θ of the optical anisotropical layer obtained from Example 14 was measured, and was 75 degrees.

Example 15

This Example differs from Example 1 in that the orienting solution of this Example was prepared by dissolving 6 g porcine skin gelatin (175 bloom) in a mixture of 60 g water, 17 g methanol, 30 g acetone, 6 g formaldehyde (concentration: 10 wt %), and 0.6 g acetic acid under a temperature of 65° C. The rubbing operation was conducted under a rubbing angle $\theta_R$ of 15 degrees and a roller rotating speed of 150 rpm. The oriented angle θ of the optical anisotropical layer obtained from Example 15 was measured, and was 75 degrees.

Example 16

This Example differs from Example 15 in that the roller rotating speed was 100 rpm. The oriented angle θ of the optical anisotropical layer obtained from Example 16 was measured, and was 75 degrees.

Example 17

This Example differs from Example 9 in that the rubbing angle $\theta_R$ was 15 degrees. The oriented angle θ of the optical anisotropical layer obtained from Example 17 was measured, and was 90 degrees.

Example 18

This Example differs from Example 9 in that the PET film was subjected to corona treatment prior to the application of the orienting solution to the PET film, and that the optical anisotropical layer was transferred from the PET film to a cellulous acetate film using a photo-sensitive adhesive. The optical device thus-formed was similar to the one shown in FIG. 18.

Example 19

The optical device of this Example was prepared by further processing the optical device obtained from Example 9 according to the following steps (i.e., after step (7) in Example 1):

(8) applying the orienting solution obtained from Example 13 to the first optical anisotropical layer of the optical device obtained from Example 9 so as to form an orienting coating on the first optical anisotropical layer;

(9) drying the orienting coating;

(10) rubbing the dried orienting coating using the rubbing roller under a rubbing angle $\theta_R$ equal to 0 degree so as to form a second orienting film;

(11) applying the RMS03001 type rod-like liquid crystal material (i.e., the same material used in Example 13) to the second orienting film so as to form a liquid crystal coating on the second orienting film;

(12) heating the liquid crystal coating at a temperature of about 80° C. for about one minute for alignment of the rod-like liquid crystal molecules on the second orienting film so as to form a wet film; and

(13) radiating the wet film with a UV exposure machine under a power of 0.2 J/cm² so as to harden the rod-like liquid crystal molecules and so as to form a second optical anisotropical layer on the second orienting film.

The oriented angle of the second optical anisotropical layers was measured, and was 15 degrees (i.e., the same as that of Example 13).

Example 20

This Example differs from Example 19 in that the PET film was subjected to corona treatment prior to the application of the orienting solution to the PET film, that the first optical anisotropical layer was subjected to corona treatment prior to the application of the orienting solution to the first optical anisotropical layer, and that the second oriented film was subjected to corona treatment prior to the application of the liquid crystal material to the second orienting film. The first and second optical anisotropical layers were subsequently transferred to a cellulous acetate substrate using a photo-sensitive adhesive.

Example 21

This Example is opposite to Example 19 such that the first optical anisotropical layer was obtained from Example 13 and the second optical anisotropical layer was obtained from Example 9.

Example 22

This Example differs from Example 21 in that the PET film was subjected to corona treatment prior to the application of the orienting solution to the PET film, that the first optical anisotropical layer was subjected to corona treatment prior to the application of the orienting solution to the first optical anisotropical layer, and that the second orienting film was subjected to corona treatment prior to the application of the liquid crystal material to the second orienting film. The first and second optical anisotropical layers were subsequently transferred to a cellulous acetate substrate using a photo-sensitive adhesive.

Example 23

The optical device of this Example was prepared by coating a photo-sensitive adhesive to the first optical anisotropical layer of the optical device obtained from Example 9, attaching the optical device obtained from Example 13 to that of Example 9 through the photo-sensitive adhesive, and separating the optical anisotropical layers of the assembly from the orienting film of the optical device of Example 13.

Example 24

This Example differs from Example 23 in that the PET film in Example 9 was subjected to corona treatment prior to the application of the orienting solution thereto, and that the first and second optical anisotropical layers of the assembly were transferred from the orienting film of the optical device obtained from Example 9 to a cellulous acetate film through a photo-sensitive adhesive.

Example 25

This Example differs from Example 23 in that the optical device of this Example was prepared by coating a photo-sensitive adhesive to the first optical anisotropical layer of the optical device obtained from Example 13, attaching the optical device obtained from Example 9 to that of Example 13 through the photo-sensitive adhesive, and separating the optical anisotropical layers of the assembly from the orienting film of the optical device of Example 9.

Example 26

This Example differs from Example 25 in that the PET film in Example 13 was subjected to corona treatment prior to the application of the orienting solution thereto, and that the first and second optical anisotropical layers of the assembly were transferred from the orienting film of the optical device obtained from Example 13 to a cellulous acetate film through a photo-sensitive adhesive.

Example 27

The optical device of this Example was prepared by attaching a cellulous acetate film to an iodine-doped polyvinyl alcohol film in a roll-to-roll manner so as to form a rolled polarizer, followed by attaching the optical device obtained from Example 4 to the rolled polarizer in a roll-to-roll manner so as to form a circular polarizer.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

We claim:

1. A method for making an optical device, comprising the steps of:
   (a) providing a first orienting film that is made from an orienting material having molecules, each of which has a molecular structure that is stretchable and that has a series of connected molecular units, each adjacent pair of the molecular units defining an orienting space therebetween, and forming the first orienting film on a first substrate;
   (b) rubbing the first orienting film so as to stretch the molecular structure of each of the molecules of the orienting material and so as to permit the molecular units of the molecular structure to be aligned along a first axis and to permit the orienting space between each adjacent pair of the molecular units of the molecular structure to be oriented in a direction parallel to a second axis, the first and second axes forming a predetermined angle therebetween; and
   (c) forming a first optical anisotropical layer on the first orienting film by applying a first liquid crystal film of rod-like molecules on the first orienting film which orients the rod-like molecules by virtue of spatial effect of the molecular units and the orienting spaces among the molecular units of the molecular structure on the rod-like molecules.

2. The method of claim 1, wherein the molecular structure of each of the molecules of the orienting material is helical in shape.

3. The method of claim 1, wherein the first orienting film has a layer thickness ranging from 0.01 to 0.50 µm.

4. The method of claim 1, wherein the first orienting film is rubbed by a rubbing roller in step (b) under a pile impression ranging from 0.05 mm to 0.5 mm and a roller rotating speed ranging from 100 rpm to 1500 rpm.

5. The method of claim 1, wherein, in step (b), the first substrate is moved along a long direction, and the rubbing roller is disposed in a position relative to the first substrate in such a manner so as to rub the first orienting film in a rubbing direction that forms a rubbing angle with the long direction, the rubbing angle ranging from −45 to 45 degrees.

6. The method of claim 1, wherein the first orienting film further comprises polyvinyl alcohol.

7. The method of claim 6, wherein the polyvinyl alcohol has a polymerization degree ranging from 100 to 3000.

8. The method of claim 6, wherein the polyvinyl alcohol has a saponification degree ranging from 70 mol % to 100 mol %.

9. The method of claim 1, further comprising the steps of:
   (d) applying a solution containing the orienting material to the first optical ansiotropical layer;
   (e) drying the applied solution so as to form a second orienting film on the first optical anisotropical layer;
   (f) rubbing the second orienting film on the first optical anisotropical layer;
   (g) forming a second liquid crystal film of rod-like molecules on the second orienting film so as to form a second optical anisotropical layer on the second orienting film; and
   (h) hardening the second liquid crystal film on the second orienting film.

10. The method of claim 9, wherein, in step (f), the first substrate is moved along a long direction, the second orienting film being rubbed in a rubbing direction that forms a rubbing angle with the long direction, the rubbing angle ranging from −45 to 45 degrees.

11. The method of claim 1, further comprising the step of transferring the first optical anisotropical layer from the first substrate to a second substrate including applying an adhesive to the second substrate, attaching the second substrate to the first optical anisotropical layer through the adhesive, followed by separating the first optical anisotropical layer from the first orienting film.

12. The method of claim 11, wherein the adhesive is made from an isotropic adhesive.

* * * * *